US006909732B2

(12) United States Patent
Imajuku et al.

(10) Patent No.: US 6,909,732 B2
(45) Date of Patent: Jun. 21, 2005

(54) METHOD AND APPARATUS FOR CONTROLLING OPTICAL WAVELENGTH BASED ON OPTICAL FREQUENCY PULLING

(75) Inventors: Wataru Imajuku, Tokyo (JP); Yoshitada Katagiri, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/060,999

(22) Filed: Jan. 29, 2002

(65) Prior Publication Data

US 2002/0088920 A1 Jul. 11, 2002

Related U.S. Application Data

(62) Division of application No. 09/296,082, filed on Apr. 21, 1999, now Pat. No. 6,370,169.

(30) Foreign Application Priority Data

Apr. 22, 1998 (JP) ......................................... P10-112509

(51) Int. Cl.[7] .............................................. H01S 3/13
(52) U.S. Cl. ...................................................... 372/32
(58) Field of Search .............................. 372/32, 38, 29, 372/30

(56) References Cited

U.S. PATENT DOCUMENTS

| 4,685,772 A |   | 8/1987  | Chang            |         |
|-------------|---|---------|------------------|---------|
| 4,839,614 A |   | 6/1989  | Hill et al.      |         |
| 4,956,812 A | * | 9/1990  | Seya et al.      | 365/119 |
| 5,218,422 A |   | 6/1993  | Zoechbauer       |         |
| 5,453,833 A |   | 9/1995  | Kawashima et al. |         |
| 5,544,183 A | * | 8/1996  | Takeda           | 372/26  |
| 5,731,874 A | * | 3/1998  | Maluf            | 356/326 |
| 5,956,356 A |   | 9/1999  | Bergmann et al.  |         |
| 5,991,477 A |   | 11/1999 | Ishikawa et al.  |         |
| 6,157,025 A |   | 12/2000 | Katagiri et al.  |         |
| 6,370,169 B1| * | 4/2002  | Imajuku et al.   | 372/32  |

FOREIGN PATENT DOCUMENTS

| JP | 63-300585  | 12/1988 |
| JP | 01-158788  | 6/1989  |
| JP | 03-72239   | 3/1991  |
| JP | 04-35079   | 2/1992  |
| JP | 04-287985  | 10/1992 |
| JP | 05-206580  | 8/1993  |
| JP | 05-347605  | 12/1993 |
| JP | 06-56758   | 8/1994  |
| JP | 11-133472  | 5/1999  |

* cited by examiner

*Primary Examiner*—David Vu
*Assistant Examiner*—Dung T Nguyen
(74) *Attorney, Agent, or Firm*—Brenda O. Holmes; Kilpatrick Stockton LLP

(57) ABSTRACT

Optical wavelength control method and apparatus which are capable of controlling an optical wavelength of a light source with a central wavelength which is uncertain and unstable at nanometer order is disclosed. In the optical wavelength control apparatus, the control target light entered from the variable wavelength light source is scanned at a prescribed period and optical pulses having a phase corresponding to the optical wavelength of the control target light are obtained. Then, a phase difference between a phase of the optical pulses and a phase corresponding to a reference optical wavelength is detected, and the variable wavelength light source is controlled by feeding back the phase difference to the variable wavelength light source such that the optical wavelength of the control target light is controlled by an optical frequency pulling with respect to the reference optical wavelength according to the phase difference.

3 Claims, 19 Drawing Sheets

METHOD AND APPARATUS FOR CONTROLLING OPTICAL WAVELENGTH BASED ON OPTICAL FREQUENCY PULLING

CROSS-REFERENCE TO RELATED APPLICATION

This application is a divisional application of application Ser. No. 09/296,082 filed Apr. 21, 1999, now U.S. Pat. No. 6,370,169.

BACKGROUND OF THE INVENTION

1. Field of the Invention

The present invention relates to optical wavelength control method and apparatus for controlling an optical wavelength of a light source with a uncertain and unstable central wavelength, by pulling it into a specific optical wavelength or a reference optical wavelength defined with respect to an optical wavelength of an external input light.

2. Description of the Background Art

A laser light source containing a semiconductor laser has a central wavelength which is uncertain and unstable at nanometer order (approximately 125 GHz for optical frequencies in 1.55 µm band) due to its operation conditions such as injected current, pumping light power, environmental temperature, etc. A control technique for discriminating and stabilizing an optical wavelength of light outputted from such a light source, or a control technique for controlling an optical wavelength of light outputted from such a light source to follow an optical wavelength of an externally entered light, is therefore indispensable in systems (which are to be generically referred to as optical communication systems hereafter) such as an ultra high speed optical transmission system, a wavelength division multiplexed optical transmission system, an optical measurement device, etc.

As a conventional control technique for discriminating and stabilizing an optical wavelength of control target light outputted from a laser light source, there is a method using a cell filled with a gas of ammonia or acetylene that has absorption lines at specific optical wavelengths (optical frequencies). This is a method in which the optical wavelength of the light source is controlled by irradiating the control target light onto that gas cell and observing a light absorption rate at the gas cell. For example, there is a method for controlling the optical wavelength of the control target light which is already in practical use, in which a part of the control target light outputted from a semiconductor laser light source is entered into an acetylene gas cell that has sharp absorption lines at 1.51 to 1.55 µm range, and the semiconductor laser is adjusted such that a rate of transmitted light always stays minimum.

However, in this conventional method using a gas cell, the absorption line optical frequency of the gas is sensitive to the filling atmospheric pressure, the environmental temperature, etc., so that this method has been unable to sufficiently meet the application conditions of the optical communication systems for which a high reliability is required.

Also, in this conventional method, the optical frequency pull-in width is approximately several hundred MHz to several GHz and restricted to a vicinity of the absorption line optical frequency of the gas cell, so that it is often unable to meet various practical requirements. Namely, this conventional method cannot be considered as having a sufficient optical frequency pull-in width for controlling the optical wavelength of the laser light source with a central wavelength which is uncertain and unstable at nanometer order (approximately 125 GHz for optical frequencies in 1.55 µm band).

From a viewpoint of the optical wavelength control for a laser light source, relevant prior art techniques can be classified into the following three categories.

(1) A laser light source optical frequency stabilization technique using a gas cell or an optical filter as optical frequency discrimination means.

(2) A laser light source optical frequency control technique using a diffraction grating as optical frequency discrimination means.

(3) An optical phase synchronization technique using optical PLL (Phase-Locked Loop).

The technique (1) realizes the stabilization control of the laser oscillation frequency by setting the laser light source optical frequencies in a vicinity of the absorption wavelengths of the gas cell or the transmission wavelengths of the optical filter and carrying out the optical frequency discrimination. However, in this technique (1), the absorption wavelengths of the gas cell or the transmission wavelengths of the optical filter are distributed in an optical frequency space discretely, so that it is difficult in principle to realize the laser light source optical frequency stabilization by setting the optical frequencies continuously (see Japanese Patent Application 2-201987 (1990), for example).

The technique (2) realizes the laser oscillation optical frequency control in a similar way as in the technique (1), by using the Bragg diffraction grating, AWG (Array Waveguide) filter, etc., as the optical frequency discrimination means. As in the case of the technique (1), in this technique (2), it is difficult in principle to realize the laser light source optical frequency stabilization by setting the optical frequencies continuously. In addition, as a DC driven differential detector is to be utilized as means for detecting a state of the optical frequency discrimination, so that there is a practical problem that it is difficult to remove DC drift components of a control circuit (see Japanese Patent Application 9-199779 (1997), for example).

Moreover, both the technique (1) and the technique (2) do not have a sufficient pull-in width with respect to a semiconductor laser light source with a large optical frequency variation in which the oscillation optical frequency can vary by 100 GHz or more, so that these techniques lack the reliability.

The technique (3) can realize the optical frequency pull-in control continuously with respect to an offset frequency defined with reference to a light source with a high optical frequency stability. However, in this technique (3), the pull-in range of the optical PLL circuit is limited to about 100 MHz at best, which is three orders of magnitude smaller than the optical frequency variation width of the semiconductor laser, so that it must be used in combination with the other optical frequency stabilization technique.

SUMMARY OF THE INVENTION

It is therefore an object of the present invention to provide optical wavelength control method and apparatus which are capable of controlling an optical wavelength of a light source with a central wavelength which is uncertain and unstable at nanometer order, by pulling it into a prescribed reference optical wavelength at the optical frequency pull-in width of 100 GHz or more.

According to one aspect of the present invention there is provided an apparatus for controlling an optical wavelength of a control target light outputted from a variable wavelength light source, comprising: a wavelength scanning unit for scanning at a prescribed period the control target light entered from the variable wavelength light source and obtaining optical pulses having a phase corresponding to the optical wavelength of the control target light; and a phase detection unit for detecting a phase difference between a phase of the optical pulses and a phase corresponding to a reference optical wavelength, and controlling the variable wavelength light source by feeding back the phase difference to the variable wavelength light source such that the optical wavelength of the control target light is controlled by an optical frequency pulling with respect to the reference optical wavelength according to the phase difference.

According to another aspect of the present invention there is provided an apparatus for controlling an optical wavelength of a control target light outputted from a variable wavelength light source, comprising: an optical diffraction unit for diffracting the control target light entered from the variable wavelength light source into a direction corresponding to the optical wavelength of the control target light; a periodic signal generation unit for detecting a diffraction light diffracted by the optical diffraction unit and generating periodic signals with a phase varies according to a diffraction direction of the diffraction light; and a phase detection unit for detecting a phase difference between a phase of the periodic signals and a phase corresponding to a reference optical wavelength, and controlling the variable wavelength light source by feeding back the phase difference to the variable wavelength light source such that the optical wavelength of the control target light is controlled by an optical frequency pulling with respect to the reference optical wavelength according to the phase difference.

According to another aspect of the present invention there is provided an apparatus for controlling optical wavelengths of control target lights outputted from N variable wavelength light sources, where N is an integer, the apparatus comprising: a periodic modulation signal generation unit for generating N periodic modulation signals in mutually different frequencies, according to which the control target lights are to be modulated; a wavelength scanning unit for scanning at a prescribed period the control target lights modulated at the mutually different frequencies and obtaining N optical pulses having phases respectively corresponding to the optical wavelengths of the control target lights; a control signal generation unit for generating N control signals respectively from the N periodic modulation signals and N reference signals having phases respectively corresponding to reference optical wavelengths for the N variable wavelength light sources; and a phase detection unit for detecting N phase differences between phases of respective ones of the N optical pulses and phases of respective ones of the N control signals, and controlling the N variable wavelength light sources by feeding back the N phase differences to the N variable wavelength light sources respectively such that the optical wavelengths of the control target lights are controlled by an optical frequency pulling with respect to the reference optical wavelengths according to the N phase differences respectively.

According to another aspect of the present invention there is provided an apparatus for controlling optical wavelengths of control target lights outputted from N variable wavelength light sources, where N is an integer, the apparatus comprising: a periodic modulation signal generation unit for generating N periodic modulation signals in mutually different frequencies, according to which the control target lights are to be modulated; an optical diffraction unit for diffracting the control target lights modulated at the mutually different frequencies into directions respectively corresponding to the optical wavelengths of the control target lights; a periodic signal generation unit for detecting diffraction lights diffracted by the optical diffraction unit and collectively generating N periodic signals with phases varied according to diffraction directions of the diffraction lights; a control signal generation unit for generating N control signals respectively from the N periodic modulation signals and N reference signals having phases respectively corresponding to reference optical wavelengths for the N variable wavelength light sources; and a phase detection unit for detecting N phase differences between phases of respective ones of the N periodic signals and phases of respective ones of the N control signals, and controlling the N variable wavelength light sources by feeding back the N phase differences to the N variable wavelength light sources respectively such that the optical wavelengths of the control target lights are controlled by an optical frequency pulling with respect to the reference optical wavelengths according to the N phase differences respectively.

According to another aspect of the present invention there is provided a method for controlling an optical wavelength of a control target light outputted from a variable wavelength light source, comprising the steps of: scanning at a prescribed period the control target light entered from the variable wavelength light source and obtaining optical pulses having a phase corresponding to the optical wavelength of the control target light; detecting a phase difference between a phase of the optical pulses and a phase corresponding to a reference optical wavelength; and controlling the variable wavelength light source by feeding back the phase difference to the variable wavelength light source such that the optical wavelength of the control target light is controlled by an optical frequency pulling with respect to the reference optical wavelength according to the phase difference.

According to another aspect of the present invention there is provided a method for controlling an optical wavelength of a control target light outputted from a variable wavelength light source, comprising the steps of: diffracting at an optical diffraction device the control target light entered from the variable wavelength light source into a direction corresponding to the optical wavelength of the control target light; detecting a diffraction light diffracted by the optical diffraction device and generating periodic signals with a phase varies according to a diffraction direction of the diffraction light; detecting a phase difference between a phase of the periodic signals and a phase corresponding to a reference optical wavelength; and controlling the variable wavelength light source by feeding back the phase difference to the variable wavelength light source such that the optical wavelength of the control target light is controlled by an optical frequency pulling with respect to the reference optical wavelength according to the phase difference.

According to another aspect of the present invention there is provided a method for controlling optical wavelengths of control target lights outputted from N variable wavelength light sources, where N is an integer, the method comprising the steps of: generating N periodic modulation signals in mutually different frequencies, according to which the control target lights are to be modulated; scanning at a prescribed period the control target lights modulated at the mutually different frequencies and obtaining N optical pulses having phases respectively corresponding to the optical wavelengths of the control target lights; generating N control signals respectively from the N periodic modulation signals and N reference signals having phases respectively corresponding to reference optical wavelengths for the N variable wavelength light sources; detecting N phase differences between phases of respective ones of the N optical pulses and phases of respective ones of the N control signals; and controlling the N variable wavelength light sources by feeding back the N phase differences to the N variable wavelength light sources respectively such that the optical wavelengths of the control target lights are controlled by an optical frequency pulling with respect to the reference optical wavelengths according to the N phase differences respectively.

According to another aspect of the present invention there is provided a method for controlling optical wavelengths of control target lights outputted from N variable wavelength light sources, where N is an integer, the method comprising the steps of: generating N periodic modulation signals in mutually different frequencies, according to which the control target lights are to be modulated; diffracting the control target lights modulated at the mutually different frequencies into directions respectively corresponding to the optical wavelengths of the control target lights; detecting diffraction lights diffracted by the optical diffraction unit and collectively generating N periodic signals with phases varied according to diffraction directions of the diffraction lights; generating N control signals respectively from the N periodic modulation signals and N reference signals having phases respectively corresponding to reference optical wavelengths for the N variable wavelength light sources; and detecting N phase differences between phases of respective ones of the N periodic signals and phases of respective ones of the N control signals, and controlling the N variable wavelength light sources by feeding back the N phase differences to the N variable wavelength light sources respectively such that the optical wavelengths of the control target lights are controlled by an optical frequency pulling with respect to the reference optical wavelengths according to the N phase differences respectively.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 11, basic configurations of an optical wavelength control apparatus according to the present invention will be described first.

FIGS. 1 to 8 show basic configurations of the optical wavelength control apparatus according to the present invention.

Figure 1:
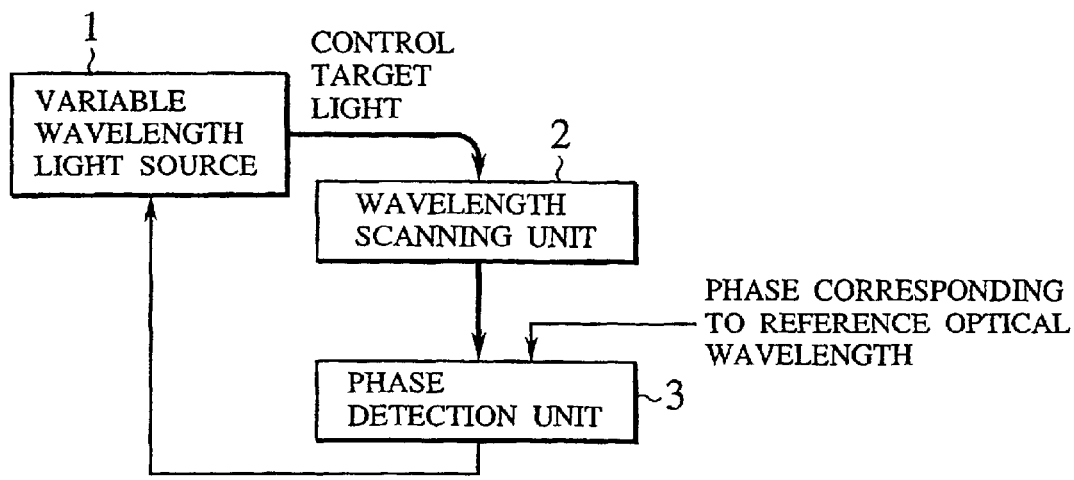
FIG. 1 is a block diagram showing the first basic configuration of the optical wavelength control apparatus according to the present invention.

In the configuration of FIG. 1, an optical wavelength of control target light outputted from a variable wavelength light source 1 is scanned at a prescribed period by a wavelength scanning unit 2, and optical pulses with a phase corresponding to the optical wavelength are outputted. Then, a phase detection unit 3 compares a phase of the optical pulses with a phase corresponding to a reference optical wavelength, and a phase error signal indicating a phase difference between them is outputted as a feed-back to the variable wavelength light source 1 so as to control the optical wavelength of the control target light.

Figure 2:
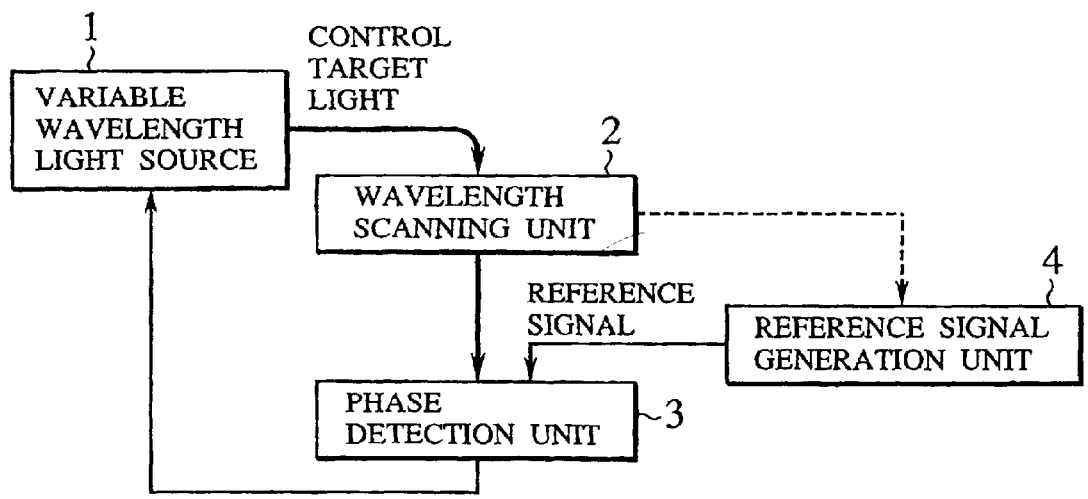
FIG. 2 is a block diagram showing the second basic configuration of the optical wavelength control apparatus according to the present invention.

In the configuration of FIG. 2, a reference signal generation unit 4 for generating a reference signal having a phase corresponding to the reference optical wavelength in synchronization with the scanning period of the wavelength scanning unit 2 and supplying the generated reference signal to the phase detection unit 3 is added to the configuration of FIG. 1.

Figure 3:
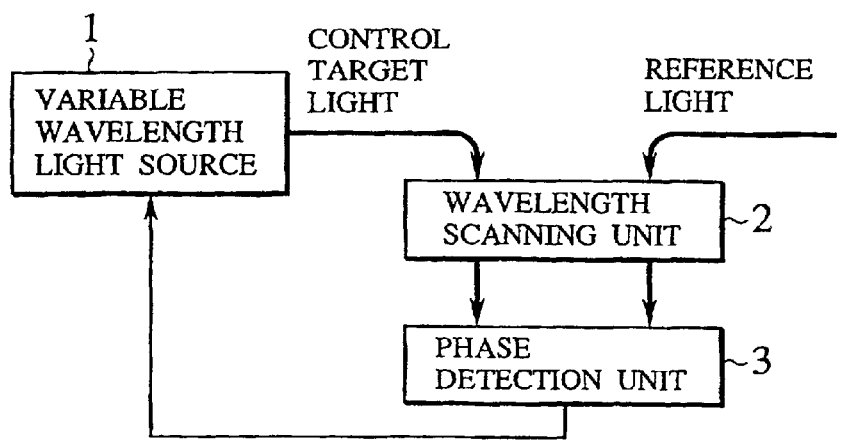
FIG. 3 is a block diagram showing the third basic configuration of the optical wavelength control apparatus according to the present invention.

In the configuration of FIG. 3, a reference light having the reference optical wavelength is also entered into the wavelength scanning unit 2, and the optical pulses with a phase corresponding to the reference optical wavelength are also outputted. Then, the phase detection unit 3 compares a phase of the optical pulses obtained from the control target light and a phase of the optical pulses obtained from the reference light, and outputs a phase error signal indicating a phase difference between them as a control signal to be fed back to the variable wavelength light source 1.

Figure 4:
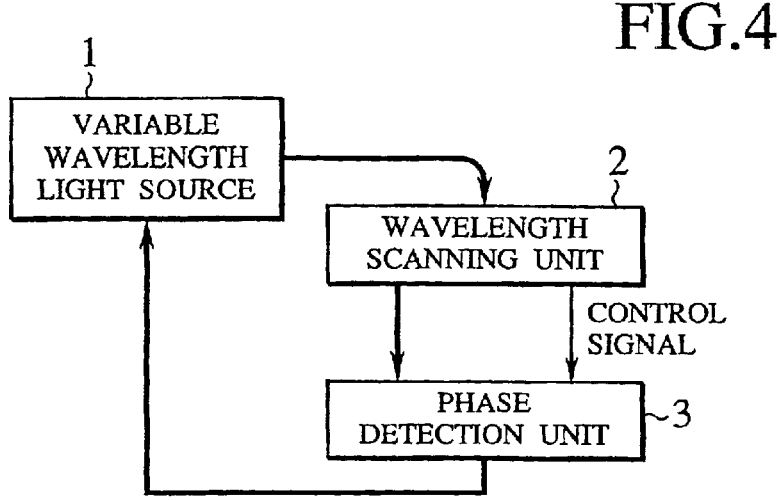
FIG. 4 is a block diagram showing the fourth basic configuration of the optical wavelength control apparatus according to the present invention.

In the configuration of FIG. 4, the wavelength scanning unit 2 outputs optical pulses at a timing corresponding to the optical wavelength of the control target light while also generating periodic control signals corresponding to a prescribed optical wavelength. The phase detection unit 3 then compares a phase of the optical pulses obtained from the control target light as it passes through the wavelength scanning unit 2 with a phase of the control signals, and outputs a phase error signal indicating a phase difference between them as the feed-back to the variable wavelength light source 1. Here, the periodic control signals may be given in forms of pulse signals.

Figure 5:
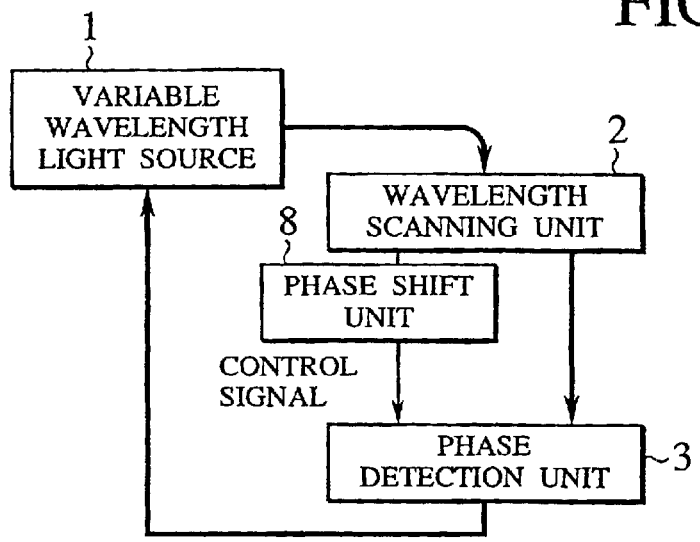
FIG. 5 is a block diagram showing the fifth basic configuration of the optical wavelength control apparatus according to the present invention.

In the configuration of FIG. 5, the wavelength scanning unit 2 outputs optical pulses at a timing corresponding to the optical wavelength of the control target light while also generating periodic control signals corresponding to a prescribed optical wavelength. The control signals are then converted into reference signals at a phase shift unit 8 by giving a phase shift corresponding to a phase difference between a phase of the control signals and a reference signal phase of the reference optical wavelength into which the optical wavelength is to be pulled. The phase detection unit 3 then compares a phase of the optical pulses obtained from the control target light as it passes through the wavelength scanning unit 2 with a phase of the reference signals, and outputs a phase error signal indicating a phase difference between them as the feed-back to the variable wavelength light source 1.

Figure 6:
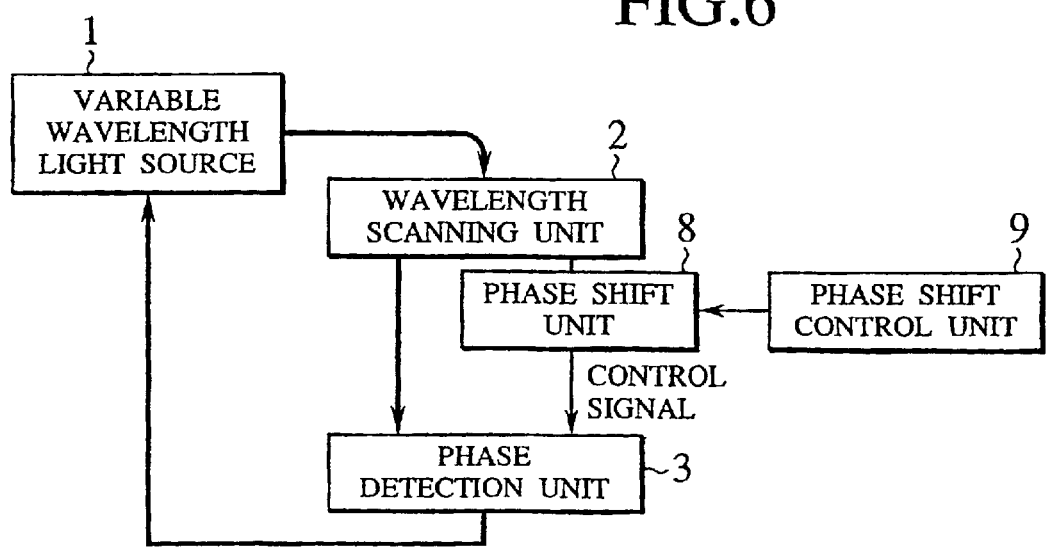
FIG. 6 is a block diagram showing the sixth basic configuration of the optical wavelength control apparatus according to the present invention.

In the configuration of FIG. 6, the wavelength scanning unit 2 outputs optical pulses at a timing corresponding to the optical wavelength of the control target light while also generating periodic control signals corresponding to a prescribed optical wavelength. The control signals are then converted into reference signals at a phase shift unit 8 by giving a phase shift corresponding to a phase difference between a phase of the control signals and a reference signal phase of the reference optical wavelength into which the optical wavelength is to be pulled, under a control of a phase shift control unit 9 which sets the wavelength scanning characteristics and the operation environmental conditions of the wavelength scanning unit 2 as parameters for the phase shift unit 8. The phase detection unit 3 then compares a phase of the optical pulses obtained from the control target light as it passes through the wavelength scanning unit 2 with a phase of the reference signals, and outputs a phase error signal indicating a phase difference between them as the feed-back to the variable wavelength light source 1.

Figure 7:
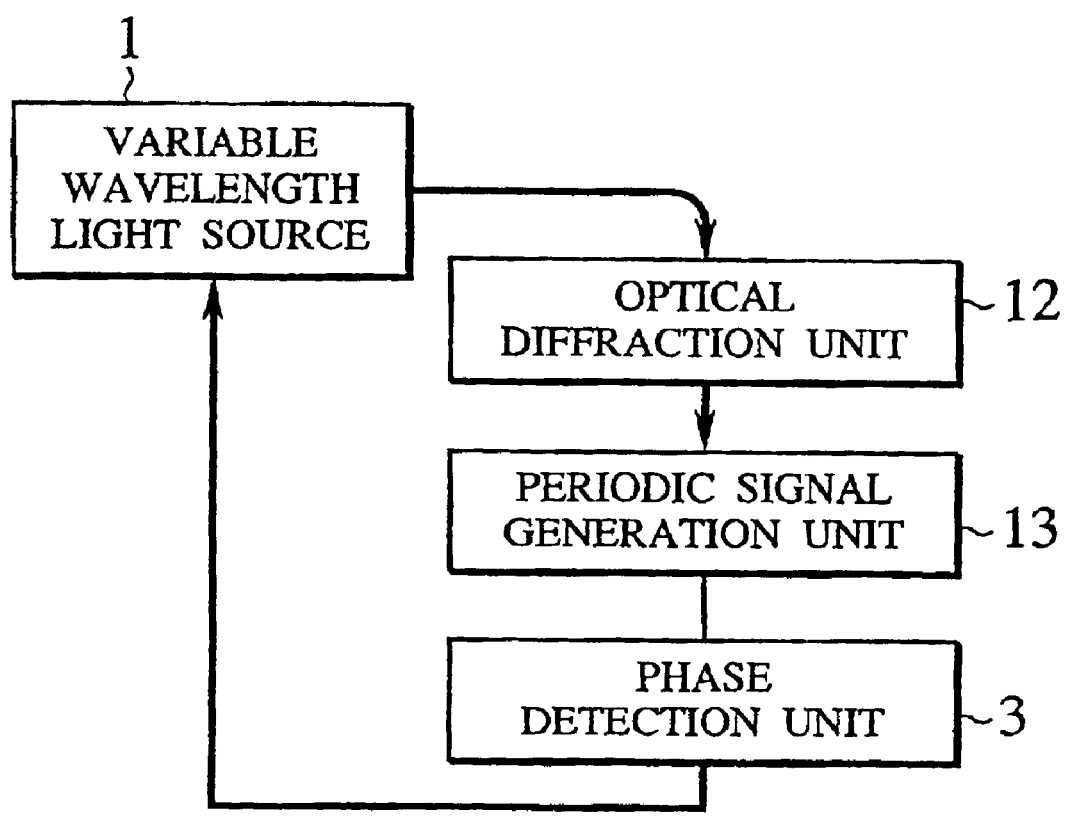
FIG. 7 is a block diagram showing the seventh basic configuration of the optical wavelength control apparatus according to the present invention.

In the configuration of FIG. 7, a control target light outputted from a variable wavelength light source 1 is diffracted into a direction corresponding to the optical wavelength of the control target light by an optical diffraction unit 12. Then, a periodic signal generation unit 13 generates periodic signals with a phase varied according to a diffraction direction of diffracted light. The phase detection unit 3 then compares a phase of the periodic signals with a phase corresponding to a reference optical wavelength, and outputs a phase error signal indicating a phase difference between them as the feed-back to the variable wavelength light source 1.

This configuration of FIG. 7 realizes the function equivalent to the wavelength scanning unit of FIG. 1 to FIG. 6, by the optical diffraction unit 12 and the periodic signal generation unit 13 that detects the diffracted light. Unlike the case of using an optical filter, this configuration contains no mechanical driving part, so that it is possible to achieve a high operation reliability.

Figure 8:
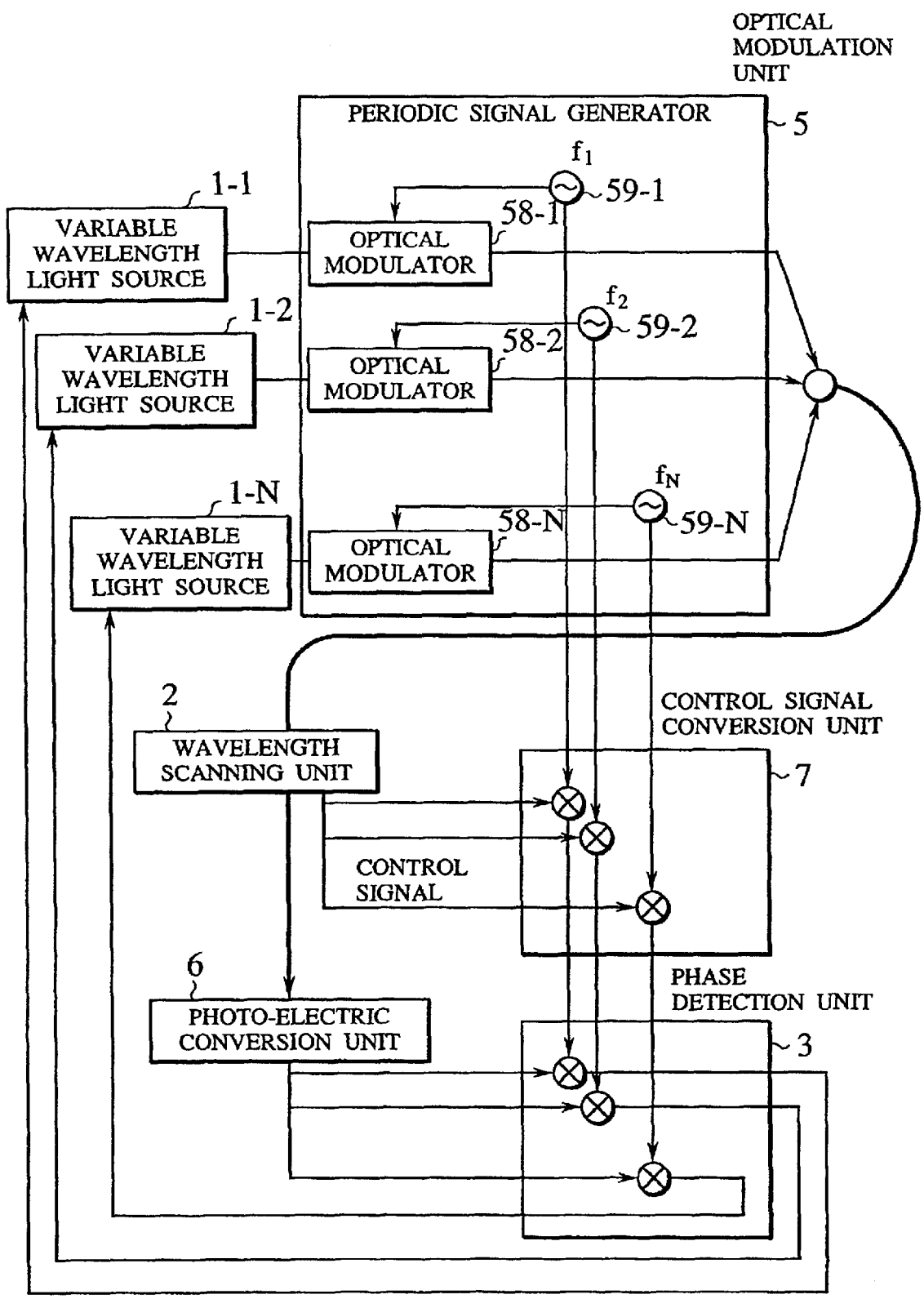
FIG. 8 is a block diagram showing the eighth basic configuration of the optical wavelength control apparatus according to the present invention.

In the configuration of FIG. 8, control target lights outputted from a plurality of variable wavelength light sources 1—1 to 1-N are intensity modulated by modulation signals having mutually different frequencies f1 to fN generated by periodic signal generators 5-1 to 5-N at an optical modulation unit 5 and then entered into the wavelength scanning unit 2. The wavelength scanning unit 2 then outputs optical pulses at timings corresponding to the optical wavelengths of the control target lights while also generating periodic control signals corresponding to a prescribed optical wavelength. A photo-electric conversion unit 6 converts the optical pulses outputted from the wavelength scanning unit 2 into electric signals, while a control signal conversion unit 7 obtains converted control signals from the control signals outputted from the wavelength scanning unit 2 by multiplying the corresponding periodic signals generated by the periodic signal generators 5-1 to 5-N. The phase detection unit 3 then compares phases of the optical pulses obtained from the control target lights as they pass through the wavelength scanning unit 2 with phases of the corresponding converted control signals, and outputs phase error signals indicating phase differences between them as the feed-back to the respective variable wavelength light sources 1—1 to 1-N.

Here, the control target lights are intensity modulated using the signals generated by the periodic signal generators in the optical modulation unit 5, in order to provide the control target lights with number information corresponding to the respective variable wavelength light sources. In this way, it becomes possible to prevent an error such as erroneously pulling the optical wavelength of the light source #1 into the reference optical wavelength for the light source #N.

Note that the the optical modulation unit 5 is provided to carry out the intensity modulation, but the optical modulation unit 5 may be omitted in the case where the desired intensity modulation can be obtained by the direct modulation of the light source, for example.

In the present invention, the wavelength scanning unit 2 which has a transmission wavelength that varies at a prescribed period T is used as means for discriminating the optical wavelength of the control target light. This wavelength scanning unit 2 can be formed, for example, by a disk shaped tunable optical filter as described in the co-pending, commonly assigned U.S. patent application Ser. No. 09/174,724, which is incorporated herein by reference. Alternatively, this wavelength scanning unit 2 can be formed by a Mach-Zender interferometer type optical filter or an etalon filter in which the transmission optical wavelength can be periodically varied according to the periodically varying applied voltage, or else an acousto-optic tunable filter driven by an RF (Radio Frequency) signal source in which the transmission optical wavelength can be linearly and periodically varied with respect to time.

Figure 9A:
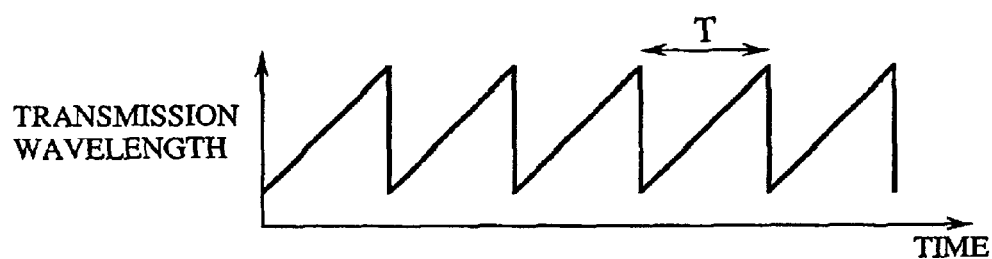
FIGS. 9A and 9B are diagrams for explaining the operation of a wavelength scanning unit in the optical wavelength control apparatus of FIG. 1 to FIG. 7.
Figure 9B:
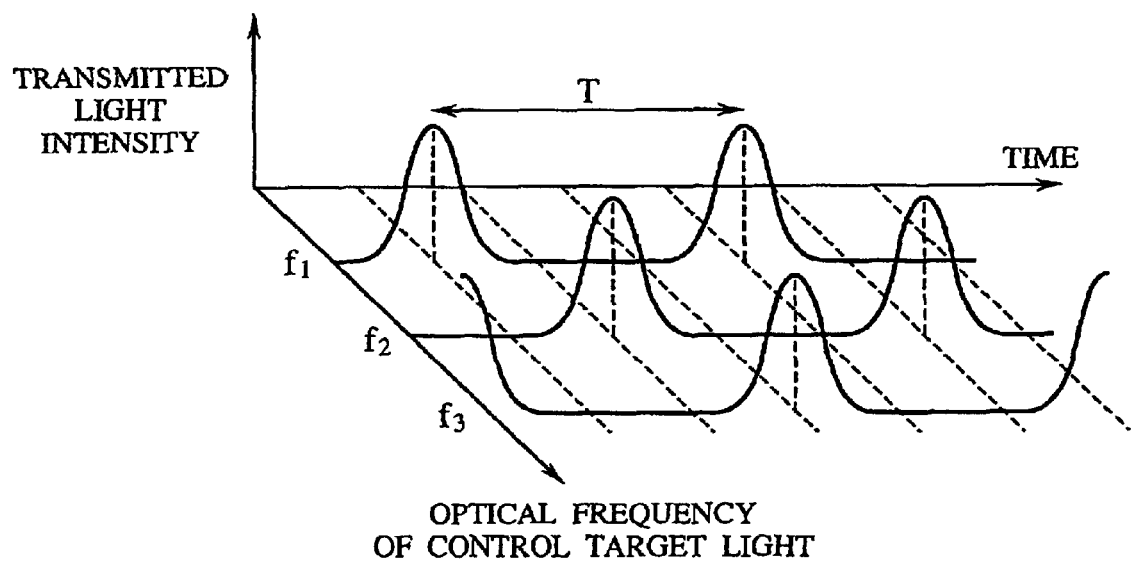

As shown in FIG. 9A, the transmission wavelength is controlled to be varying linearly and periodically so that the control target light that passed through the wavelength scanning unit 2 will be given in forms of optical pulses with a period T. Namely, as shown in FIG. 9B, the repetition frequency of the transmitted optical pulses remains T as long as the optical wavelength of the control target light remains unchanged, and a change in the optical wavelength appears as a change in the output timing of the transmitted optical pulse. This output timing of the transmitted optical pulse will be referred to as a phase in the present specification.

Figure 10A:
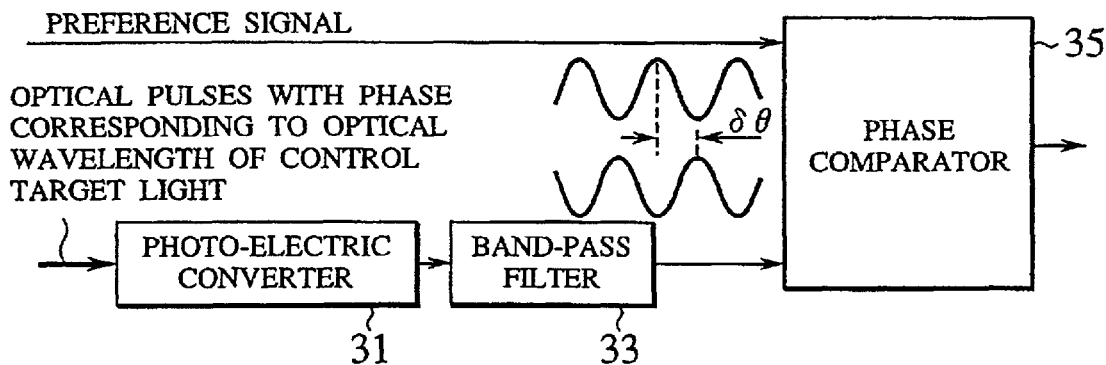
FIGS. 10A and 10B are block diagrams showing two exemplary configurations of a phase detection unit in the optical wavelength control apparatus of FIG. 1 to FIG. 8.
Figure 10B:
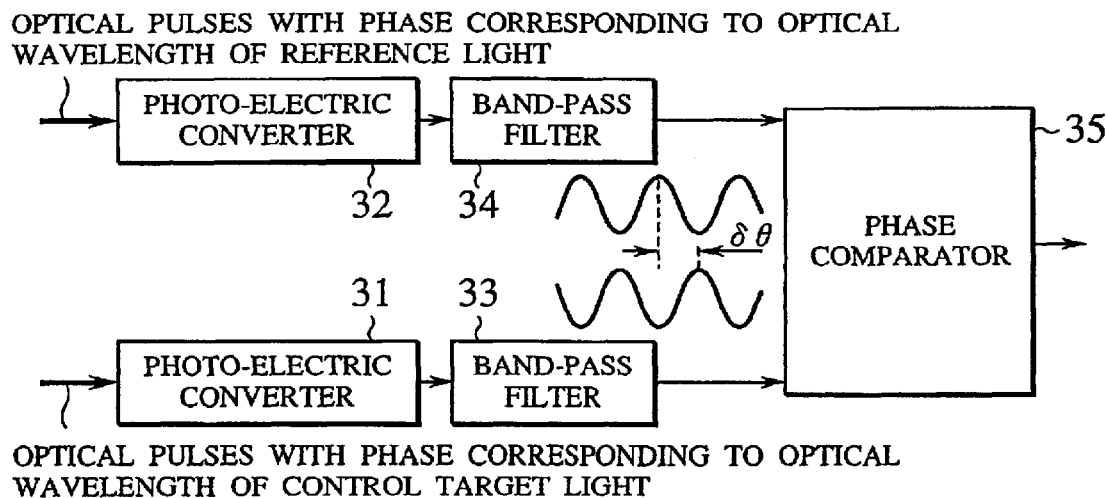

The phase detection unit 3 is formed by a photo-electric converter 31, a band-pass filter 33 and a phase comparator 35 as shown in FIG. 10A, or by photo-electric converters 31 and 32, band-pass filters 33 and 34, and a phase comparator 35 as shown in FIG. 10B, for example. In the configurations of FIG. 1 and FIG. 2 described above, the phase detection unit 3 has a configuration shown in FIG. 10A.

Figure 11:
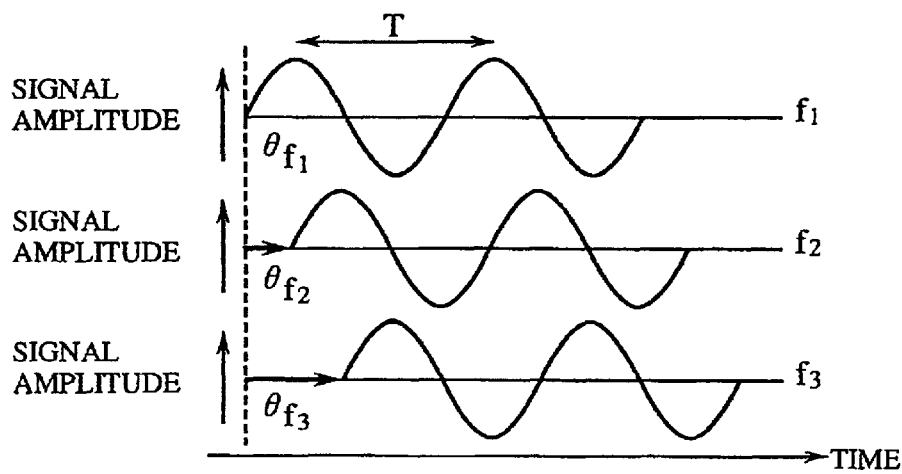
FIG. 11 is a diagram for explaining the operation of the phase detection unit of FIGS. 10A and 10B.

By converting the optical pulses outputted from the wavelength scanning unit 2 into electric signals by the photo-electric converter 31 and entering the resulting electric signals into the band-pass filter 33 for discriminating the fundamental frequency component, it is possible to obtain a sinusoidal wave signal given by:

$$E_1=\sin(2\pi ft+\theta_1), \quad (1)$$

where $f=1/T$, and a phase $\theta_1$ has a value corresponding to the optical frequency of the control target light as shown in FIG. 11. If the optical frequency of the control target light is changed, for the reasons described above, the phase of the sinusoidal wave signal is changed by $\delta\theta$ as follows:

$$E_1=\sin(2\pi(f+\delta f)t+\theta_1)=\sin(2\pi ft+\theta_1+\delta\theta). \quad (2)$$

Here, it is assumed that a frequency change of the signal is large enough to be captured as a phase change.

On the other hand, a sinusoidal wave signal (reference signal) synchronized with the period T of the transmission wavelength variation of the wavelength scanning unit 2 is generated at the reference signal generation unit 4, and a phase $\theta_2$ corresponding to the desired optical wavelength of the control target light to be realized is given to the generated reference signal. Namely, a sinusoidal wave signal given by:

$$E_2=\sin(2\pi ft+\theta_2+\pi/2) \quad (3)$$

is generated. By entering this reference signal $E_2$ and the output signal $E_1$ of the band-pass filter 33 into the phase comparator 35, and extracting only components in a vicinity of DC component, an output given by:

$$E_3=\sin(\theta_1-\theta_2) \quad (4)$$

can be obtained.

This output signal $E_3$ becomes zero when the phase $\theta_1$ of the output signal $E_1$ of the band-pass filter 33 and the phase $\theta_2$ of the reference signal $E_2$ generated by the reference signal generation unit 4 coincide, that is, when the central wavelength of the control target light coincides with the target optical wavelength. By providing this signal $E_3$ as a feed-back to the variable wavelength light source 1 and controlling the optical wavelength accordingly, the optical wavelength of the control target light can be pulled into the reference optical wavelength, over a wide bandwidth of nanometer order.

In the case of carrying out the pull-in control with respect to the reference optical wavelength of an externally entered reference light as in the configuration of FIG. 3, the phase detection unit 3 has a configuration as shown in FIG. 10B. Here, the reference light is also entered into the wavelength scanning unit 2 at the same time. Then, the transmitted optical pulses are converted into electric signals by the photo-electric converter 32, and the reference signal corresponding to the above described equation (3) is generated through the band-pass filter 34 and entered into the phase comparator 35.

Note that, when the etalon filter or the Mach-Zender filter is used as the optical filter in the wavelength scanning unit 2, the wavelength scanning characteristics of the optical filter will have poor linearity in the relationship between the scanning control signal input and the transmission wavelength, and an inferior certainty or reproducibility of the transmission wavelength with respect to the control signal input. In order to alleviate these problems, the configurations of FIG. 4 to FIG. 6 can be used.

In these configurations, the control signals corresponding to the transmission wavelengths are generated by the wavelength scanning unit 2 itself, and the phase $\theta_2$ is controlled by giving a phase shift to these control signals according to the state and the operation conditions of the optical filter used in the wavelength scanning unit 2. These phase shifted control signals are then used as reference signals and entered into the phase detection unit 3 along with the signals obtained from the optical pulses of the control target light. This is crucially different from the case of FIG. 2 in that the phase of the reference signal directly corresponds to the transmission wavelength of the optical filter itself. In general, the transmission wavelength of the optical filter is largely dependent on the operation environment, so that the driving signal of the optical filter and the transmission wavelength of the optical filter is not in one-to-one correspondence. By extracting the transmission wavelength of the optical filter as a signal in some specific timing (by attaching a marker on the optical filter and directly identifying the transmission wavelength by using the marker), it is possible to improve the reliability of the control circuit as a whole considerably.

Figure 12:
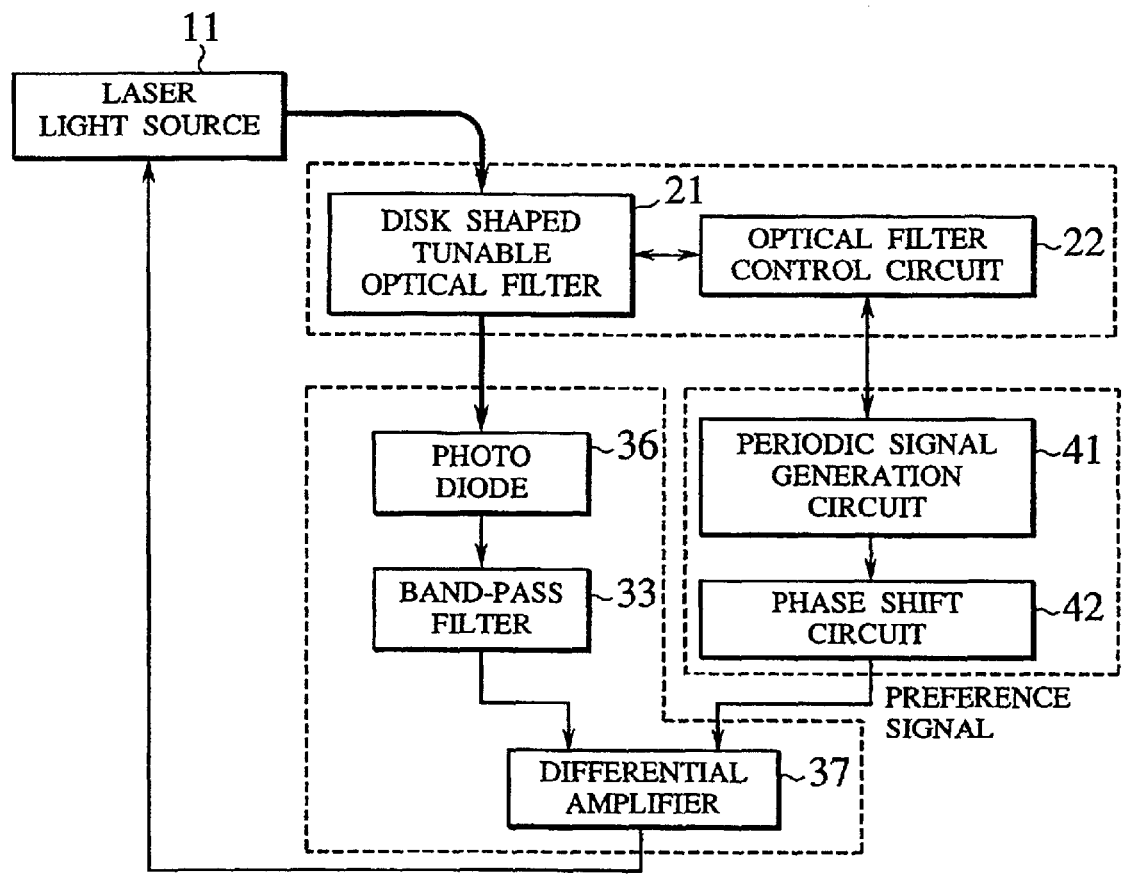
FIG. 12 is a block diagram showing the first embodiment of the optical wavelength control apparatus according to the present invention.
Figure 13:
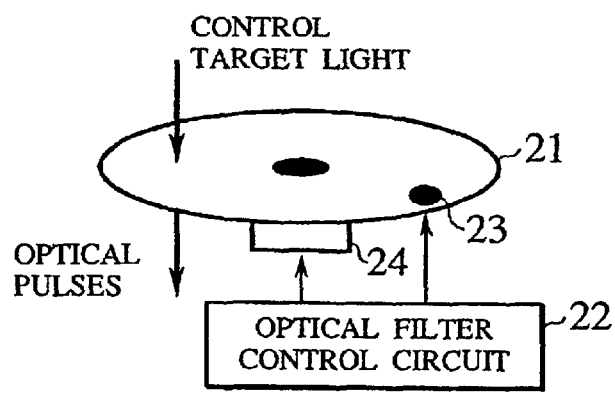
FIG. 13 is a schematic diagram showing a disk shaped tunable optical filter used in the optical wavelength control apparatus of FIG. 12.

Referring now to FIG. 12 and FIG. 13, the first embodiment of an optical wavelength control apparatus according to the present invention will be described in detail. This first embodiment corresponds to the configuration of FIG. 2 described above, which is directed to a case of realizing the optical frequency pulling by using an optical frequency of a reference signal generated by the reference signal generation unit 4 as a reference.

In an optical wavelength control apparatus of FIG. 12, the variable wavelength light source 1 of FIG. 2 is provided by a laser light source 11, while the wavelength scanning unit 2 of FIG. 2 is provided by a disk shaped tunable optical filter 21 and an optical filter control circuit 22. The phase detection unit 3 of FIG. 2 is provided in the configuration of FIG.

10A by a photo-diode 36 used as the photo-electric converter 31 of FIG. 10A, a band-pass filter 33, and a differential amplifier 37 used as the phase comparator 35 of FIG. 10A. The reference signal generation unit 4 of FIG. 2 is provided by a periodic signal generation circuit 41 and a phase shift circuit 42.

For the laser light source 11, a single mode external cavity type semiconductor laser which oscillates at 1.55 μm band is used. A cavity length varies according to the feed-back signal, such that the oscillation frequency changes by 10 GHz per 1V of the feed-back signal voltage, for example.

The disk shaped tunable optical filter 21 is formed by an etalon filter having different transmission frequencies along its rotation angle direction as shown in FIG. 13, where the transmission wavelength can be linearly and periodically changed by rotating this etalon filter at a prescribed frequency (period T). The optical filter control circuit 22 reads off a marker 23 provided on the disk shaped tunable optical filter 21, and controls the rotation frequency of the disk shaped tunable optical filter 21 by adjusting the rotation speed of a motor 24. The transmission wavelength can be controlled within an error of about 1 GHz with reference to the reference optical frequency, for example. The transmission wavelength of the disk shaped tunable optical filter 21 is periodically varied in a range between 1540 nm to 1560 nm, and the filtering with the full width at half maximum equal to 0.1 nm (10 GHz) is realized.

The periodic signal generation circuit 41 generates reference signals which are synchronized with the period T of the transmission wavelength change at the disk shaped tunable optical filter 21. The phase shift circuit 42 gives a phase corresponding to a desired optical wavelength for the control target light, to the reference signals.

The photo-diode 36, the band-pass filter 33 and the differential amplifier 37 that constitute the phase detection unit 3 of FIG. 2 operate as follows. The optical pulses outputted from the disk shaped tunable optical filter 21 are converted into electric signals by the photo-diode 36, and entered into the band-pass filter 33 so as to obtain a sinusoidal wave signal having a phase corresponding to the optical wavelength of the laser light source 11. A phase of this signal and a phase of the reference signal outputted from the phase shift circuit 42 are compared by the differential amplifier 37, and a resulting phase error signal is fed back to the laser light source 11 as a control signal such that the central frequency of the laser light source 11 is pulled into the reference optical wavelength.

Figure 14:
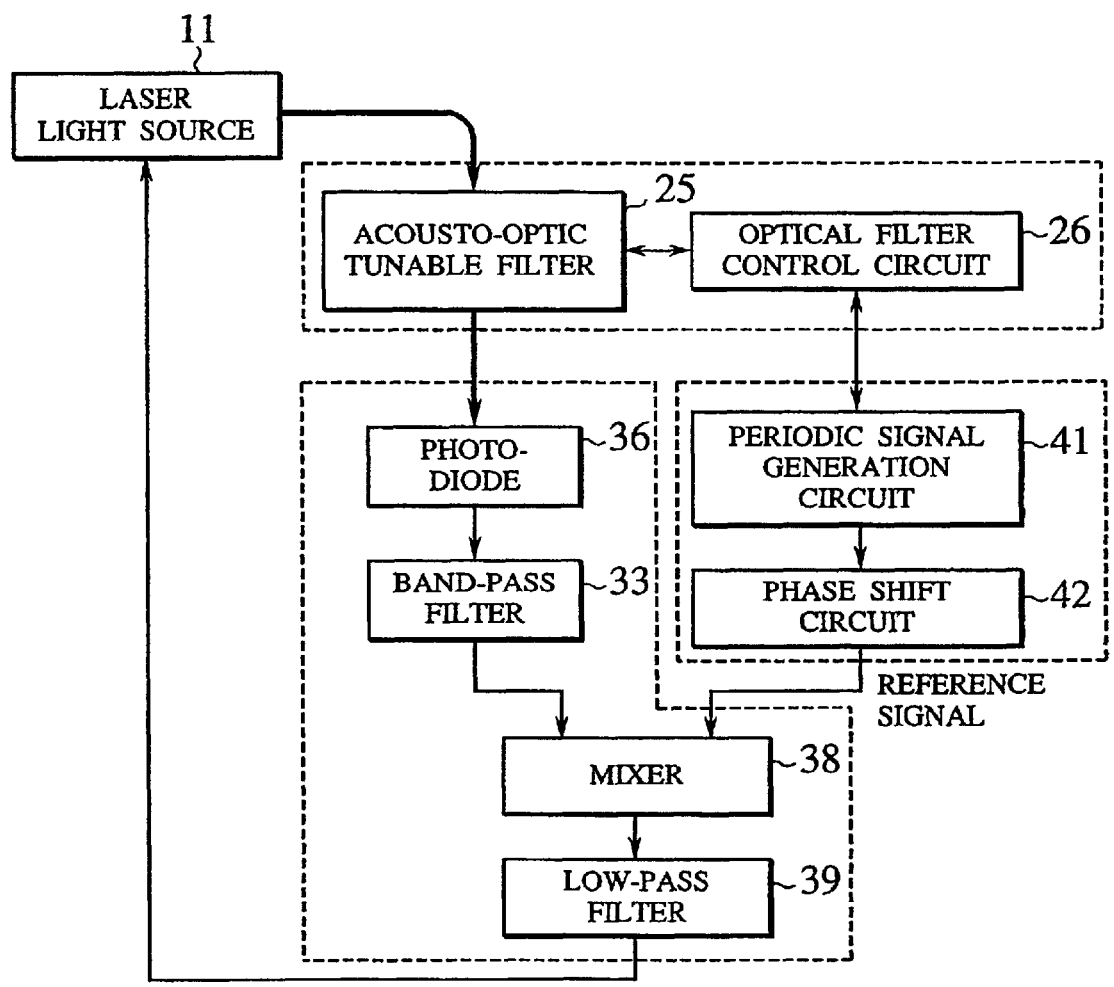
FIG. 14 is a block diagram showing the second embodiment of the optical wavelength control apparatus according to the present invention.

Referring now to FIG. 14, the second embodiment of an optical wavelength control apparatus according to the present invention will be described in detail. This second embodiment is a modification of the first embodiment in which the disk shaped tunable optical filter 21 of the first embodiment is replaced by an Acousto-Optic Tunable Filter (AOTF).

In an optical wavelength control apparatus of FIG. 14, the variable wavelength light source 1 of FIG. 2 is provided by a laser light source 11, while the wavelength scanning unit 2 of FIG. 2 is provided by an AOTF 25 and an optical filter control circuit 26. The phase detection unit 3 of FIG. 2 is provided in the configuration of FIG. 10A by a photo-diode 36 used as the photo-electric converter 31 of FIG. 10A, a band-pass filter 33, and a mixer 38 and a low-pass filter 39 which are used as the phase comparator 35 of FIG. 10A. The reference signal generation unit 4 of FIG. 2 is provided by a periodic signal generation circuit 41 and a phase shift circuit 42. Here, those elements which are substantially similar to corresponding elements in FIG. 12 described above are given the same reference numerals in FIG. 14, and their description will not be repeated.

The AOTF 25 is controlled by the optical filter control circuit 26 containing an RF signal source such as a voltage controlled oscillator (VCO) which drives the AOTF 25, so that the AOTF 25 is capable of controlling the transmission optical wavelength linearly according to its applied voltage. The full width at half maximum of the transmission wavelengths is 0.01 nm (approximately 1.2 GHz). The optical filter control circuit 26 generates periodic sawtooth waves and controls the transmission optical wavelength of the AOTF 25.

The optical pulses outputted from the AOTF 25 are converted into electric signals by the photo-diode 36, and entered into the band-pass filter 33 so as to obtain a sinusoidal wave signal having a phase corresponding to the optical wavelength of the laser light source 11. A phase of this signal and a phase of the reference signal outputted from the phase shift circuit 42 are compared by the mixer 38, and a resulting phase error signal is fed back to the laser light source 11 through the low-pass filter 39 as a control signal such that the central frequency of the laser light source 11 is pulled into the reference signal frequency.

Figure 15:
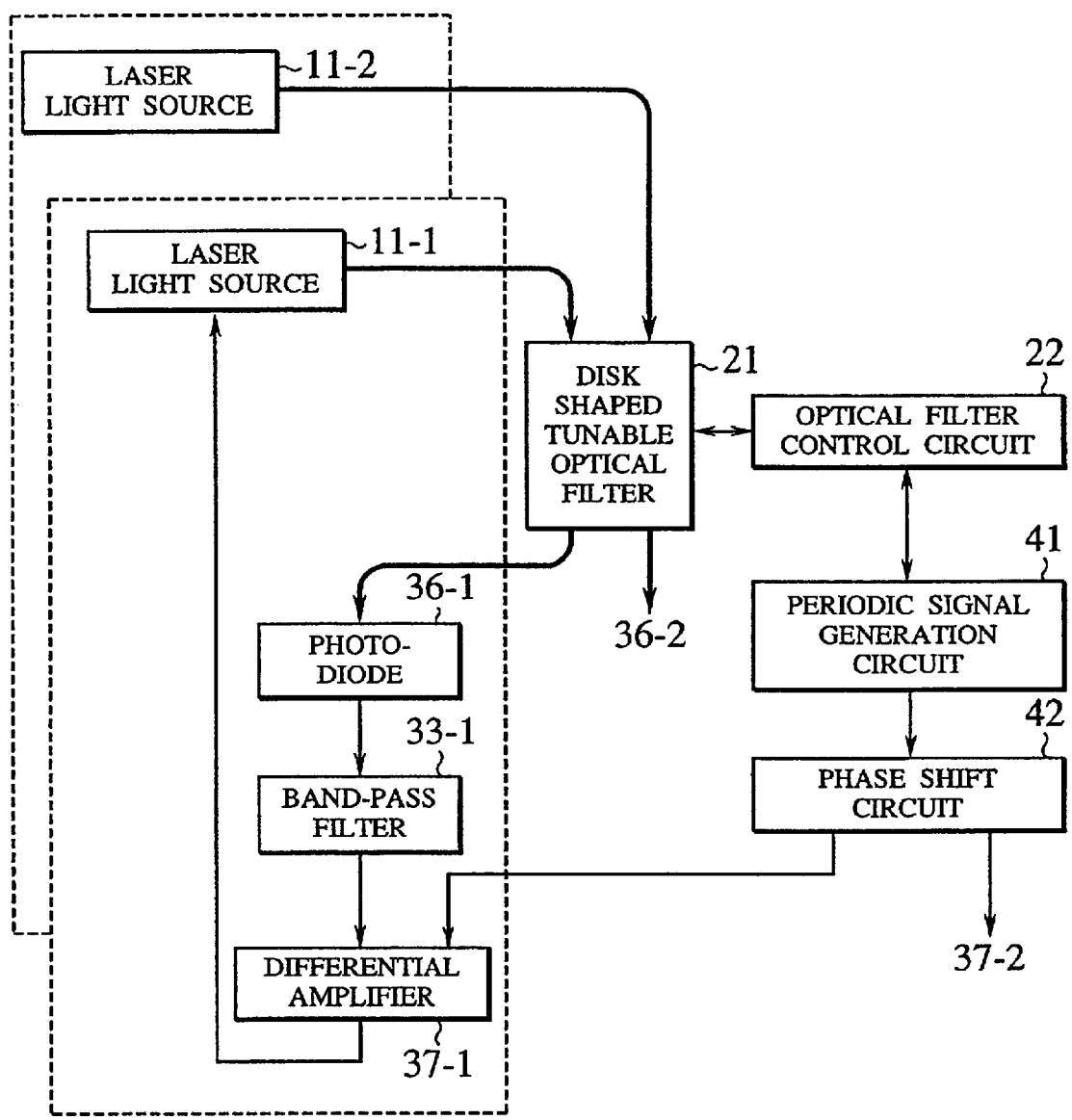
FIG. 15 is a block diagram showing the third embodiment of the optical wavelength control apparatus according to the present invention.

Referring now to FIG. 15, the third embodiment of an optical wavelength control apparatus according to the present invention will be described in detail. This third embodiment is directed to a configuration for realizing the simultaneous control of oscillation optical frequencies of a plurality of laser light sources, by utilizing the configuration of the first embodiment. Such a configuration can be used as a transmission light source of the wavelength division multiplexed transmission system.

The control target lights outputted from the laser light sources 11-1 and 11-2 are entered into the single disk shaped tunable optical filter 21 which outputs optical pulses having phases corresponding to the respective optical wavelengths. These optical pulses are entered into respectively provided photo-diodes (only 36-1 is shown in FIG. 15), and the obtained electric signals are entered into respectively provided differential amplifiers (only 37-1 is shown in FIG. 15) through respectively provided band-pass filters (only 33-1 is shown in FIG. 15). On the other hand, the periodic signal generation circuit 41 generates the reference signals which are synchronized with the period T of the transmission wavelength change at the disk shaped tunable optical filter 21, and the phase shift circuit 42 gives a phase corresponding to desired optical wavelengths for the control target lights, to the reference signals, and enters the resulting reference signals to the respective differential amplifiers.

Here, the two control target lights are entered into the disk shaped tunable optical filter 21 at 0° and 180° with respect to the rotation angle direction of the disk shaped tunable optical filter 21. As a result, when the oscillation optical frequencies of the laser light sources 11-1 and 11-2 are identical, the phases of the sinusoidal wave signals outputted from the respective band-pass filters will have a relative relationship of 0° and 180°. When the transmission optical wavelengths of the disk shaped tunable optical filter 21 are in a range of 1540 nm to 1565 nm and the signals having the same phase component as the reference signal are entered into the respective differential amplifiers, the oscillation optical wavelengths of the laser light sources 11-1 and 11-2 can be pulled into 1545 nm and 1555 nm respectively by setting the phase shift circuit 42 such that the oscillation optical wavelength becomes 1552.5 nm.

In this configuration, the simultaneous control of the oscillation optical frequencies of a plurality of laser light sources can be realized while sharing the disk shaped tunable optical filter 21, the optical filter control circuit 22, the periodic signal generation circuit 41 and the phase shift circuit 42 among a plurality of laser light sources.

Figure 16:
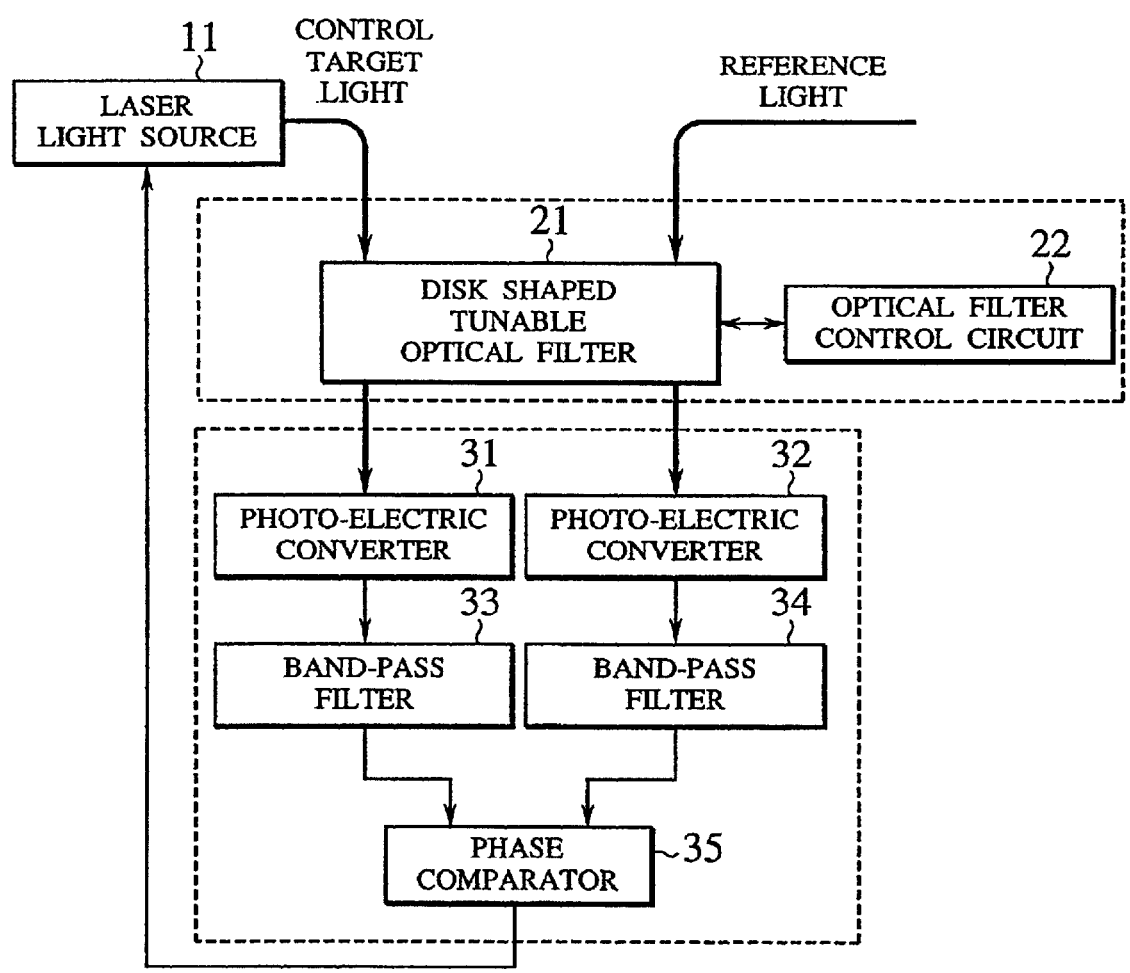
FIG. 16 is a block diagram showing the fourth embodiment of the optical wavelength control apparatus according to the present invention.

Referring now to FIG. 16, the fourth embodiment of an optical wavelength control apparatus according to the present invention will be described in detail. This fourth embodiment corresponds to the configuration of FIG. 3 described above, which is directed to a case of realizing the optical frequency pulling by using a central optical frequency of an externally entered reference signal as a reference.

In an optical wavelength control apparatus of FIG. 16, the variable wavelength light source 1 of FIG. 3 is provided by a laser light source 11, while the wavelength scanning unit 2 of FIG. 3 is provided by a disk shaped tunable optical filter 21 and an optical filter control circuit 22. The phase detection unit 3 of FIG. 3 is provided in the configuration of FIG. 10B by the photo-electric converters 31 and 32, the band-pass filters 33 and 34, and the phase comparator 35. Here, the phase comparator 35 can be realized either by a differential amplifier as in the first embodiment or by a mixer 38 and a low-pass filter 39 as in the second embodiment.

In this fourth embodiment, the control target light outputted from the laser light source 11 and the externally entered reference light are entered into the disk shaped tunable optical filter 21 with a mutual displacement of π/2 (rad) with respect to the rotation angle of the disk shaped tunable optical filter 21. In this way, when the optical frequencies of these lights are identical, two signals entered into the phase comparator 35 will have phases displaced from each other by π/2 (rad), so that the output becomes zero. Consequently, the optical frequency of the control target light can be pulled into the central optical frequency of the reference light by feeding the output signal of the phase comparator 35 back to the laser light source 11.

Figure 17:
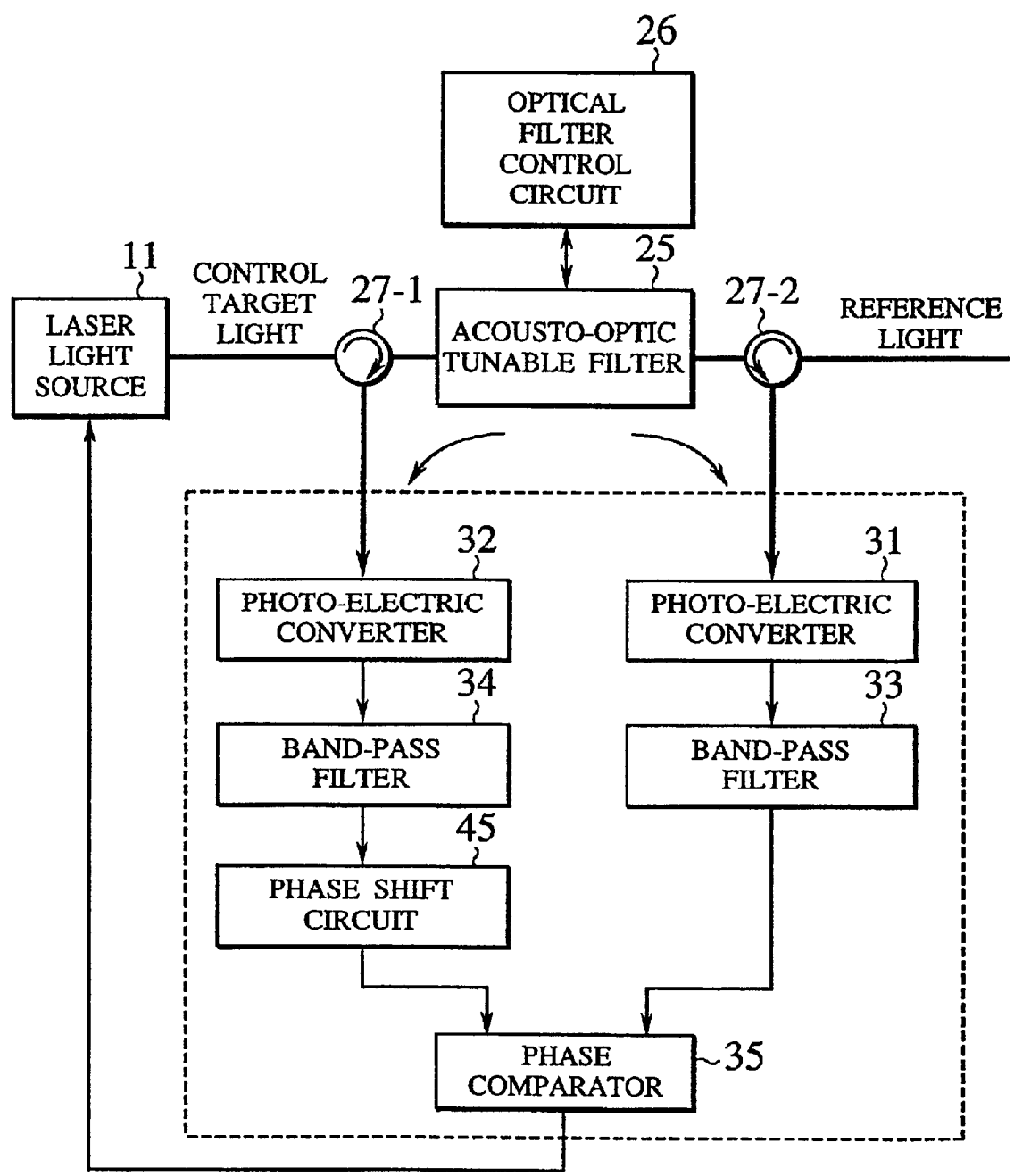
FIG. 17 is a block diagram showing the fifth embodiment of the optical wavelength control apparatus according to the present invention.

Referring now to FIG. 17, the fifth embodiment of an optical wavelength control apparatus according to the present invention will be described in detail. This fifth embodiment is a modification of the fourth embodiment in which the disk shaped tunable optical filter 21 of the fourth embodiment is replaced by an AOTF 25.

In an optical wavelength control apparatus of FIG. 17, the variable wavelength light source 1 of FIG. 3 is provided by a laser light source 11, while the wavelength scanning unit 2 of FIG. 3 is provided by an AOTF 25, an optical filter control circuit 26, and optical circulators 27-1 and 27-2. The phase detection unit 3 of FIG. 3 is provided in the configuration of FIG. 10B by the photo-electric converters 31 and 32, the band-pass filters 33 and 34, the phase comparator 35, and a phase shift circuit 45. Here, the phase comparator 35 can be realized either by a differential amplifier as in the first embodiment or by a mixer 38 and a low-pass filter 39 as in the second embodiment.

In this fifth embodiment, in order to distinguish the control target light outputted from the laser light source 11 and the externally entered reference light, these lights are entered into the AOTF 25 from opposite directions, and selectively circulated by the optical circulators 27-1 and 27-2. Namely, the control target light is entered into the AOTF 25 through the optical circulator 27-1 and then the outputted optical pulses are entered into the photo-electric converter 31 through the optical circulator 27-2. On the other hand, the reference light is entered into the AOTF 25 through the optical circulator 27-2, and then the outputted optical pulses are entered into the photo-electric converter 32 through the optical circulator 27-1.

The output signal of the photo-electric converter 31 is entered into the phase comparator 35 through the band-pass filter 33, while the output signal of the photo-electric converter 32 is entered into the phase comparator 35 through the band-pass filter 34 and the phase shift circuit 45 which gives a shift of π/2 (rad). In this way, the optical frequency of the control target light can be pulled into the central optical wavelength of the reference light by feeding the output signal of the phase comparator 35 back to the laser light source 11.

Note that, in this fifth embodiment, the AOTF 25 has the full width at half maximum of the transmission wavelengths equal to 0.01 nm (approximately 1.2 GHz) similarly as in the second embodiment, and the transmission optical wavelength varies by the frequency of 500 Hz. Namely, when the optical frequency of the laser light source 11 and the optical frequency of the reference light are not changing, the sinusoidal wave signals in the frequency of 500 Hz will be outputted from the band-pass filters 33 and 34.

Figure 18:
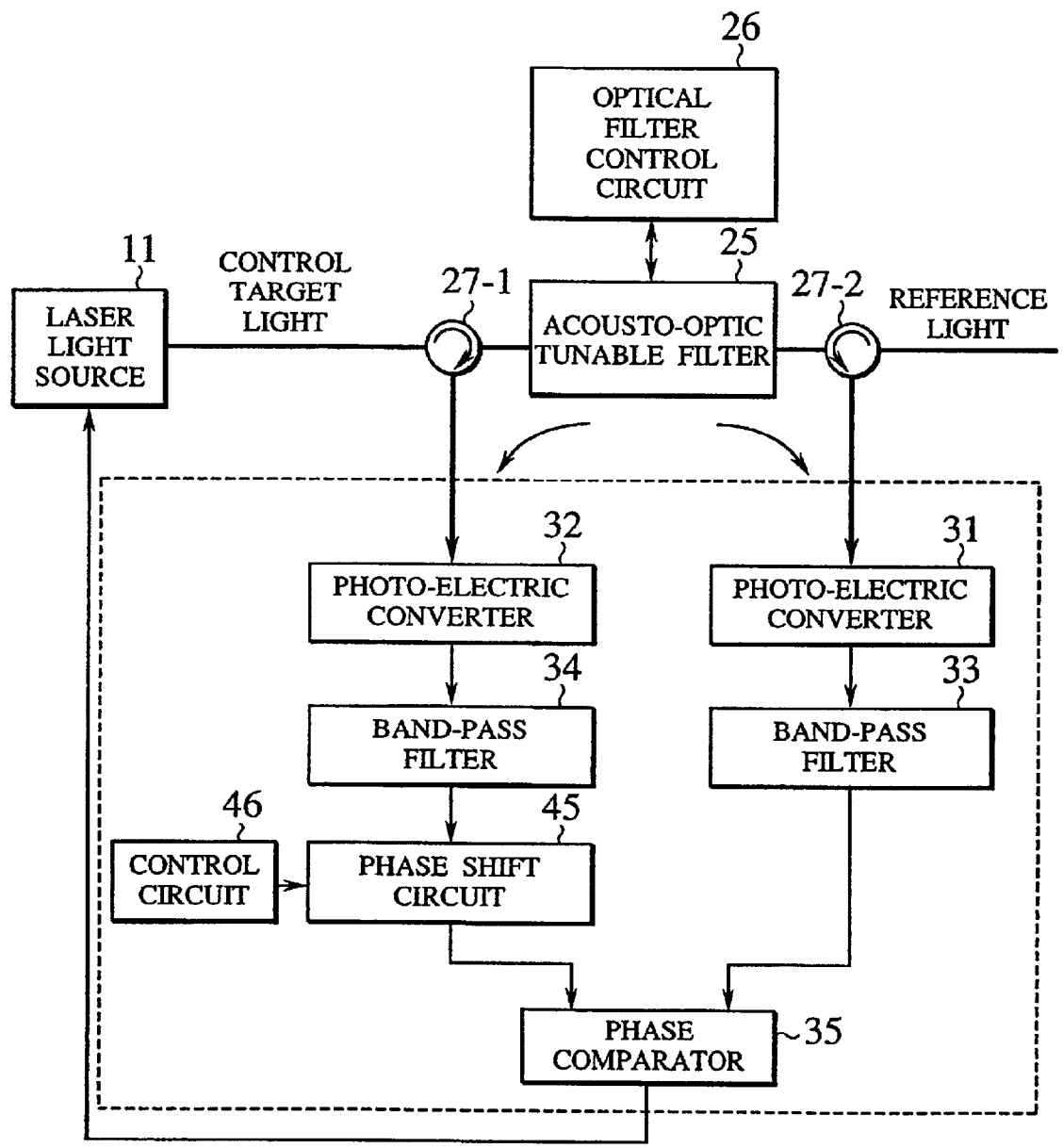
FIG. 18 is a block diagram showing the sixth embodiment of the optical wavelength control apparatus according to the present invention.

Referring now to FIG. 18, the sixth embodiment of an optical wavelength control apparatus according to the present invention will be described in detail. This sixth embodiment is a modification of the fifth embodiment in which the central optical frequency of the laser light source is pulled into an optical frequency obtained by giving an offset with respect to the externally entered reference light.

In this sixth embodiment, the phase shift amount to be set to the phase shift circuit 45 is made variable under the control of a control circuit 46. Namely, a value corresponding to an offset optical frequency is added to the phase shift amount to be set to the phase shift circuit 45. The rest of the configuration of FIG. 17 is substantially the same as FIG. 16.

For example, when the transmission optical wavelength of the AOTF 25 varies from 1545.00 nm to 1555.00 nm and the central optical frequency of the laser light source 11 is to be pulled into the optical frequency region which is shifted by about 50 GHz (wavelength of 0.4 nm) from the reference light, the phase shift amount given by:

$$\phi = \pi/2 + 2\pi(0.4/(1555.0-1545.0) = (29/50)\pi(\text{rad})$$

will be set to the phase shift circuit 45. In this way, the pull-in optical frequency can be freely set within a range of the transmission optical wavelength change at the AOTF 25.

Figure 19:
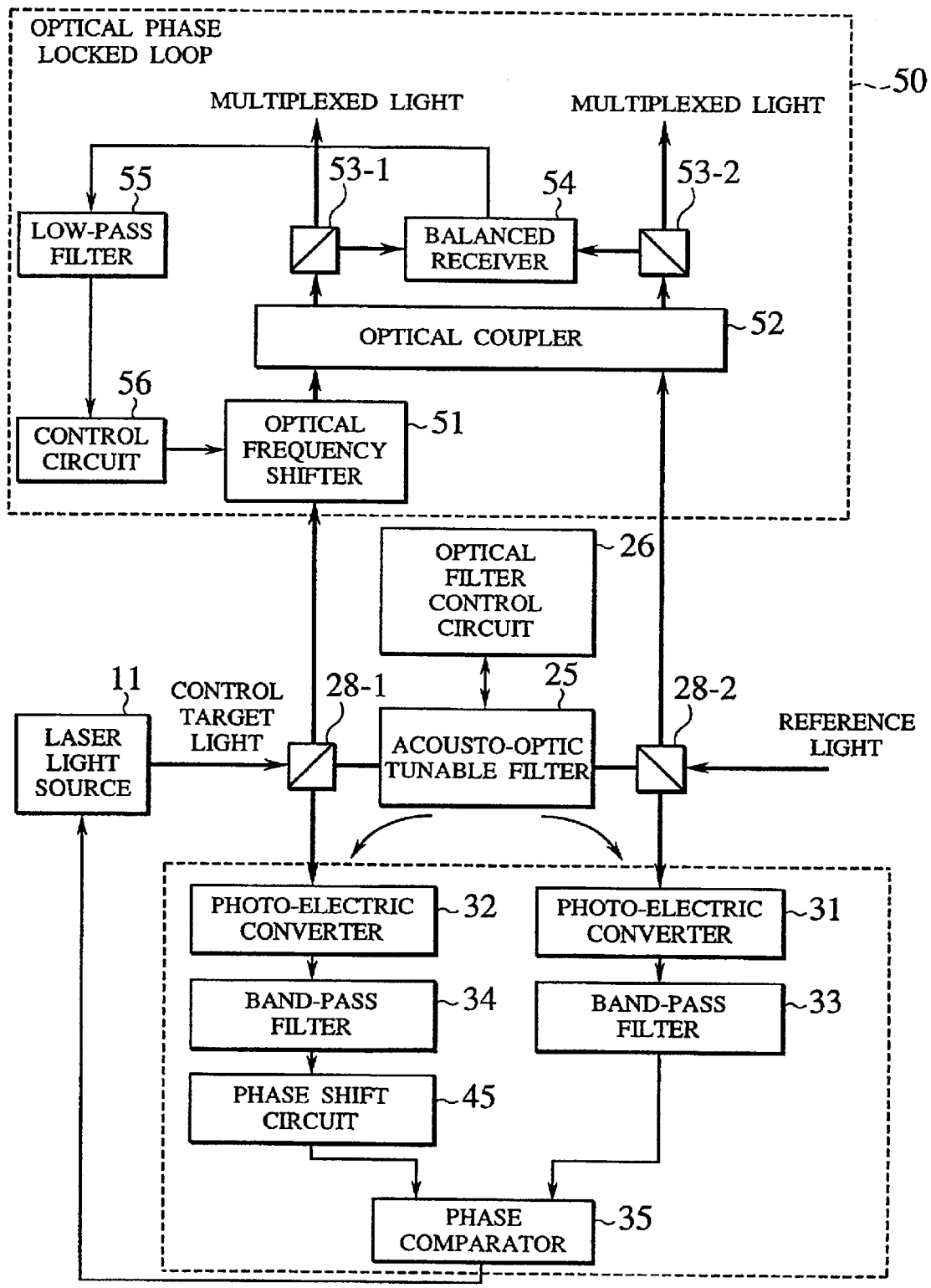
FIG. 19 is a block diagram showing the seventh embodiment of the optical wavelength control apparatus according to the present invention.

Referring now to FIG. 19, the seventh embodiment of an optical wavelength control apparatus according to the present invention will be described in detail. This seventh embodiment is directed to a case where the configuration of the fifth embodiment is combined with an optical phase locking circuit disclosed in Japanese Patent Application No. 9-301690 (1997) so as to enable the optical frequency pulling over a wide bandwidth of 100 GHz to several THz.

Here, those elements which are substantially similar to corresponding elements in FIG. 17 described above are given the same reference numerals in FIG. 19, and their description will not be repeated. Note however that the optical circulators 27-1 and 27-2 of FIG. 17 are replaced by optical couplers 28-1 and 28-2 in FIG. 19 so as to enter the control target light and the reference light into an optical phase locked loop 50.

The optical phase locked loop 50 comprises an optical frequency shifter 51 for shifting the optical frequency of the control target light, an optical coupler 52 with two inputs and two outputs for coupling the optical frequency shifted control target light and the reference light, an optical splitters 53-1 and 53-2 for splitting a part of the combined lights outputted from the optical coupler 52, a balanced receiver 54 for outputting a phase error signal proportional to a phase difference between coupled lights splitted by the optical splitters 53-1 and 53-2, a low-pass filter 55 for outputting a low frequency component of the phase error signal, and a control circuit 56 for controlling the optical frequency shifter 51 according to the output signal of the low-pass filter 55.

In this configuration of FIG. 19, the control target light outputted from the laser light source 11 can be pulled into the optical frequency of the reference light by using the configuration of the fifth embodiment, while also realizing the optical phase locking between the control target light and the reference light by using the optical phase locked loop 50. In this way, it becomes possible to realize the optical phase locking highly stably with respect to the control target light which has a wide bandwidth optical frequency jitter, even in a case of using the narrow bandwidth optical phase locked loop 50.

Note that the configuration of this seventh embodiment can be utilized as a pumping light phase control circuit for a phase sensitive optical amplifier. The phase sensitive optical amplifier is an optical amplifier which has a gain dependent on an optical phase of a signal light. For this reason, the optical phase locking between the pumping light and the signal light is indispensable in order to realize the stable optical amplification. This can be realized by the pumping light phase control circuit which requires the stability of the phase-variance or the standard phase-deviation between the pumping light and the signal light not greater than 10 degrees.

Figure 20:
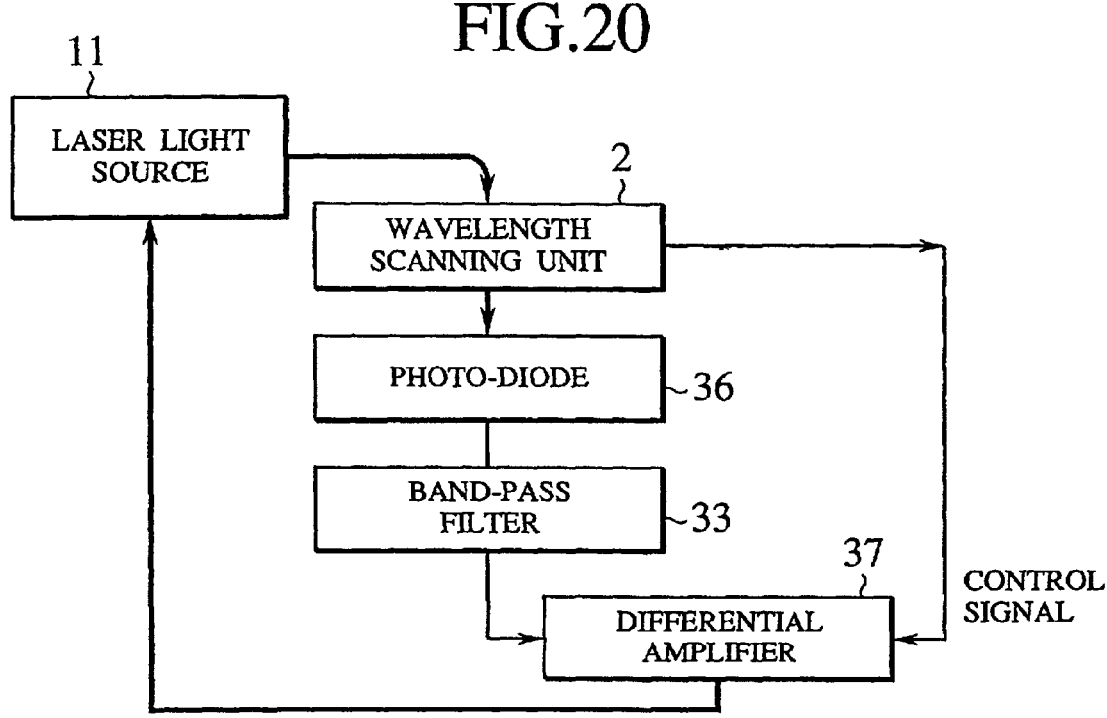
FIG. 20 is a block diagram showing the eighth embodiment of the optical wavelength control apparatus according to the present invention.
Figure 21:
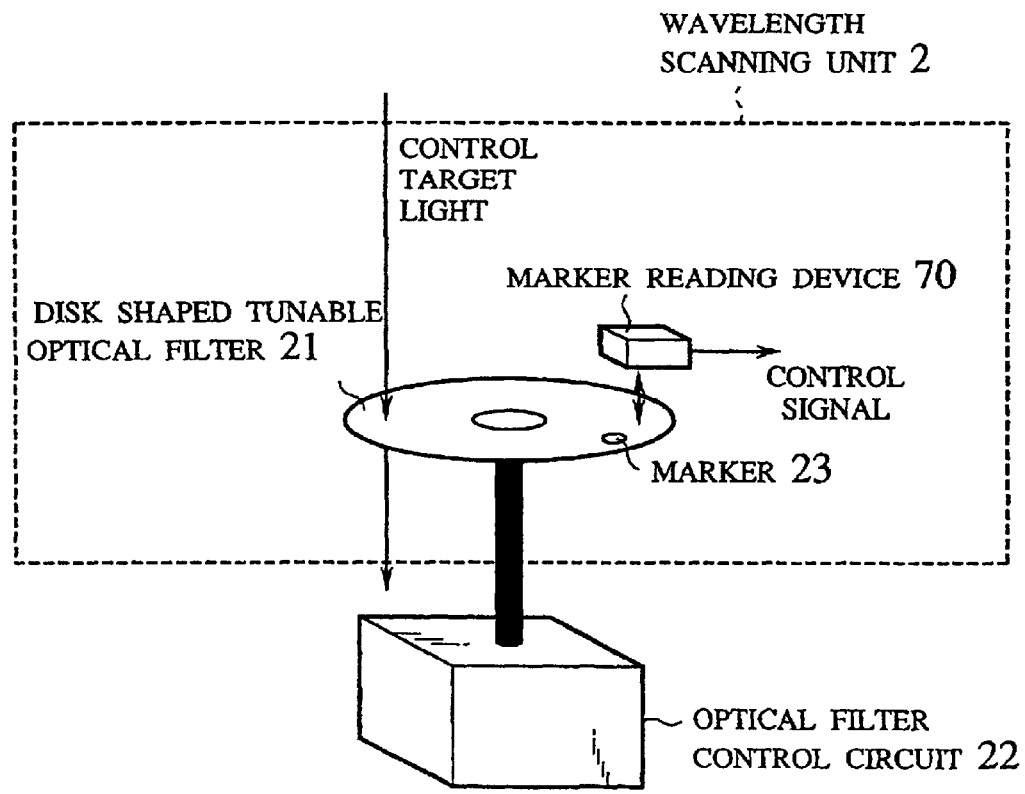
FIG. 21 is a schematic diagram showing a disk shaped tunable optical filter used in the optical wavelength control apparatus of FIG. 20.

Referring now to FIG. 20 and FIG. 21, the eighth embodiment of an optical wavelength control apparatus according to the present invention will be described in detail. This eighth embodiment corresponds to the configuration of FIG. 4 described above, which is directed to a case of realizing the optical frequency pulling by using a control signal generated by the wavelength scanning unit itself as a reference signal corresponding to the reference optical frequency.

In an optical wavelength control apparatus of FIG. 20, the variable wavelength light source 1 of FIG. 4 is provided by a laser light source 11, while the wavelength scanning unit 2 of FIG. 4 is provided by a disk shaped tunable optical filter 21 and an optical filter control circuit 22 as shown in FIG. 21. Here, the wavelength scanning unit 2 also functions as the control signal generation unit. The phase detection unit 3 of FIG. 4 is provided in the configuration of FIG. 10A by a photo-diode 36 used as the photo-electric converter 31 of FIG. 10A, a band-pass filter 33, and a differential amplifier 37 used as the phase comparator 35 of FIG. 10A.

For the laser light source 11, a single mode external cavity type semiconductor laser which oscillates at 1.55 μm band is used, similarly as in the first embodiment.

The disk shaped tunable optical filter 21 and the optical filter control circuit 22 are similar to those of the first embodiment, except that a marker reading device 70 is provided to read off the marker 23 corresponding to a prescribed transmission wavelength on the disk shaped tunable optical filter 21, and an output of the marker reading device 70 is used as a control signal. This control signal is entered into the differential amplifier 37 as a reference signal.

On the other hand, the optical pulses outputted from the disk shaped tunable optical filter 21 are converted into electric signals by the photo-diode 36, and entered into the differential amplifier 37 through the band-pass filter 33. A phase of this signal and a phase of the reference signal are compared by the differential amplifier 37, and a resulting phase error signal is fed back to the laser light source 11 such that the optical frequency of the laser light source 11 is pull-in controlled.

Figure 22:
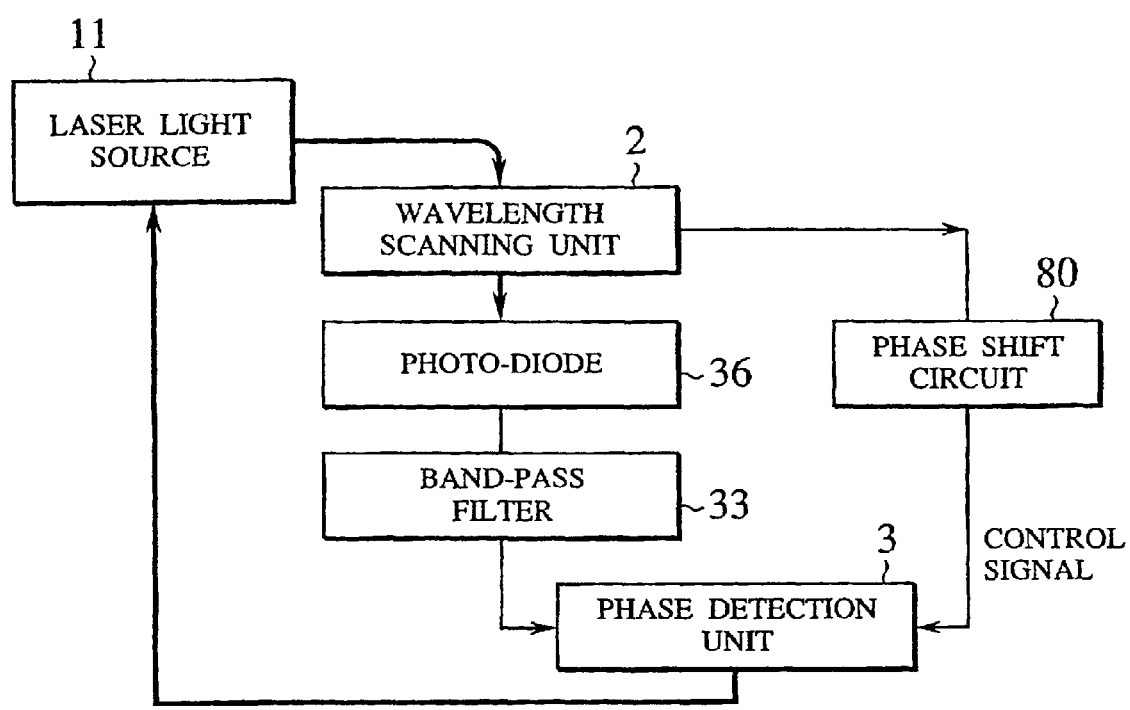
FIG. 22 is a block diagram showing the ninth embodiment of the optical wavelength control apparatus according to the present invention.

Referring now to FIG. 21 and FIG. 22, the ninth embodiment of an optical wavelength control apparatus according to the present invention will be described in detail. This ninth embodiment corresponds to the configuration of FIG. 5 described above, which is also directed to a case of realizing the optical frequency pulling by using a control signal generated by the wavelength scanning unit itself as a reference signal corresponding to the reference optical frequency.

In an optical wavelength control apparatus of FIG. 22, the variable wavelength light source 1 of FIG. 5 is provided by a laser light source 11, while the wavelength scanning unit 2 of FIG. 5 is provided by a disk shaped tunable optical filter 21 and an optical filter control circuit 22 as shown in FIG. 21. Here, the wavelength scanning unit 2 also functions as the control signal generation unit. The phase shift unit 8 of FIG. 5 is provided by a phase shift circuit 80 for phase shifting the control signal. The phase detection unit 3 of FIG. 5 is provided in the configuration of FIG. 10A by a photo-diode 36 used as the photo-electric converter 31 of FIG. 10A, a band-pass filter 33, and a differential amplifier 37 used as the phase comparator 35 of FIG. 10A.

For the laser light source 11, a single mode external cavity type semiconductor laser which oscillates at 1.55 μm band is used, similarly as in the first embodiment.

The disk shaped tunable optical filter 21 and the optical filter control circuit 22 are similar to those of the first embodiment, except that a marker reading device 70 is provided to read off the marker 23 corresponding to a prescribed transmission wavelength on the disk shaped tunable optical filter 21, and an output of the marker reading device 70 is used as a control signal. This control signal is phase shifted by the phase shift circuit 80 and then entered into the differential amplifier 37 as a reference signal.

On the other hand, the optical pulses outputted from the disk shaped tunable optical filter 21 are converted into electric signals by the photo-diode 36, and entered into the differential amplifier 37 through the band-pass filter 33. A phase of this signal and a phase of the reference signal are compared by the differential amplifier 37, and a resulting phase error signal is fed back to the laser light source 11 such that the optical frequency of the laser light source 11 is pull-in controlled.

Figure 23:
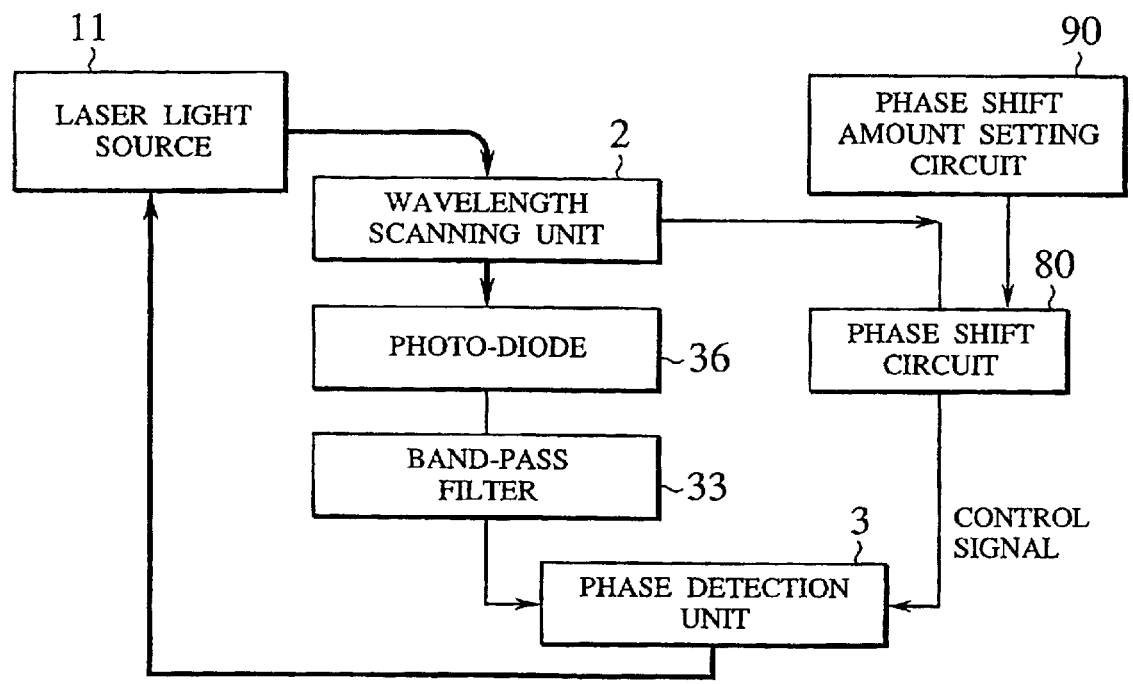
FIG. 23 is a block diagram showing the tenth embodiment of the optical wavelength control apparatus according to the present invention.

Referring now to FIG. 21 and FIG. 23, the tenth embodiment of an optical wavelength control apparatus according to the present invention will be described in detail. This tenth embodiment corresponds to the configuration of FIG. 6 described above, which is also directed to a case of realizing the optical frequency pulling by using a control signal generated by the wavelength scanning unit itself as a reference signal corresponding to the reference optical frequency.

In an optical wavelength control apparatus of FIG. 23, the variable wavelength light source 1 of FIG. 6 is provided by a laser light source 11, while the wavelength scanning unit 2 of FIG. 6 is provided by a disk shaped tunable optical filter 21 and an optical filter control circuit 22 as shown in FIG. 21. Here, the wavelength scanning unit 2 also functions as the control signal generation unit. The phase shift unit 8 of FIG. 6 is provided by a phase shift circuit 80 for phase shifting the control signal, while the phase shift control unit 9 of FIG. 6 is provided by a phase shift amount setting circuit 90 for controlling the phase shift amount to be set to the phase shift circuit 80 according to the characteristics and the operation environment of the optical filter. The phase detection unit 3 of FIG. 6 is provided in the configuration of FIG. 10A by a photo-diode 36 used as the photo-electric converter 31 of FIG. 10A, a band-pass filter 33, and a differential amplifier 37 used as the phase comparator 35 of FIG. 10A.

For the laser light source 11, a single mode external cavity type semiconductor laser which oscillates at 1.55 µm band is used, similarly as in the first embodiment.

The disk shaped tunable optical filter 21 and the optical filter control circuit 22 are similar to those of the first embodiment, except that a marker reading device 70 is provided to read off the marker 23 corresponding to a prescribed transmission wavelength on the disk shaped tunable optical filter 21, and an output of the marker reading device 70 is used as a control signal. This control signal is phase shifted by the phase shift circuit 80 under the control of the phase shift amount setting circuit 90, and then entered into the differential amplifier 37 as a reference signal. Here, the phase shift amount setting circuit 90 stores a wavelength scanning calibration information regarding relationship of the transmission wavelengths of the optical filter with respect to the environmental temperature, air pressure, etc., and operates according to this information.

On the other hand, the optical pulses outputted from the disk shaped tunable optical filter 21 are converted into electric signals by the photo-diode 36, and entered into the differential amplifier 37 through the band-pass filter 33. A phase of this signal and a phase of the reference signal are compared by the differential amplifier 37, and a resulting phase error signal is fed back to the laser light source 11 such that the optical frequency of the laser light source 11 is pull-in controlled.

Figure 24:
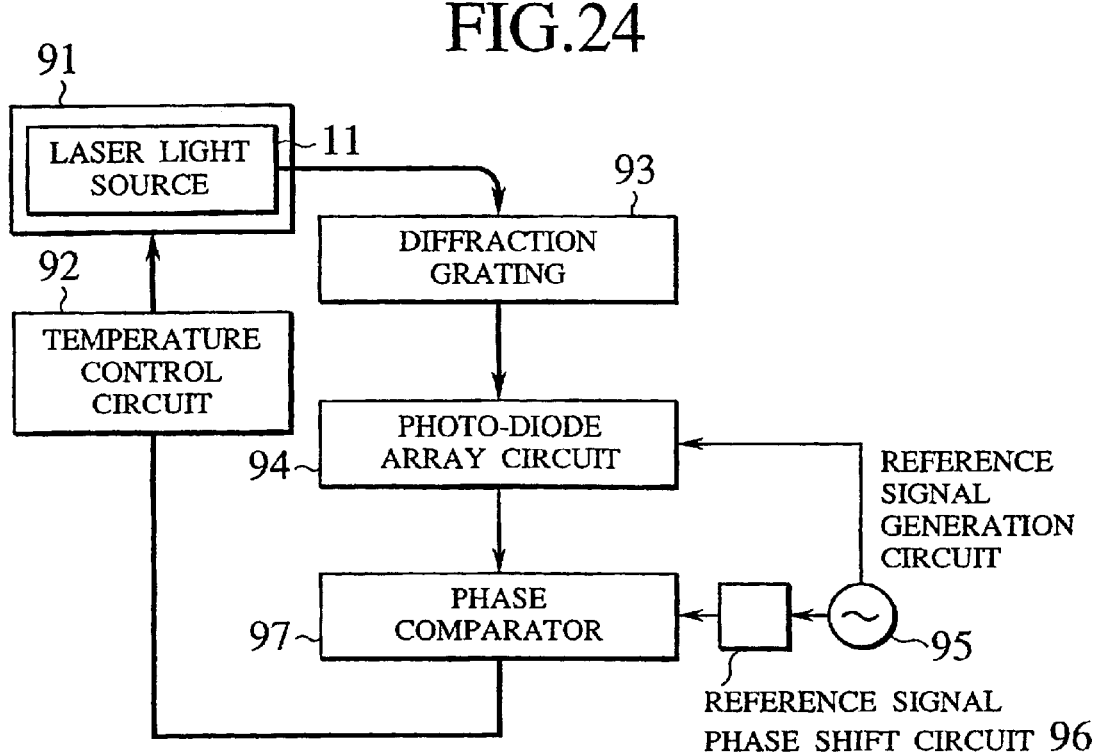
FIG. 24 is a block diagram showing the eleventh embodiment of the optical wavelength control apparatus according to the present invention.
Figure 25:
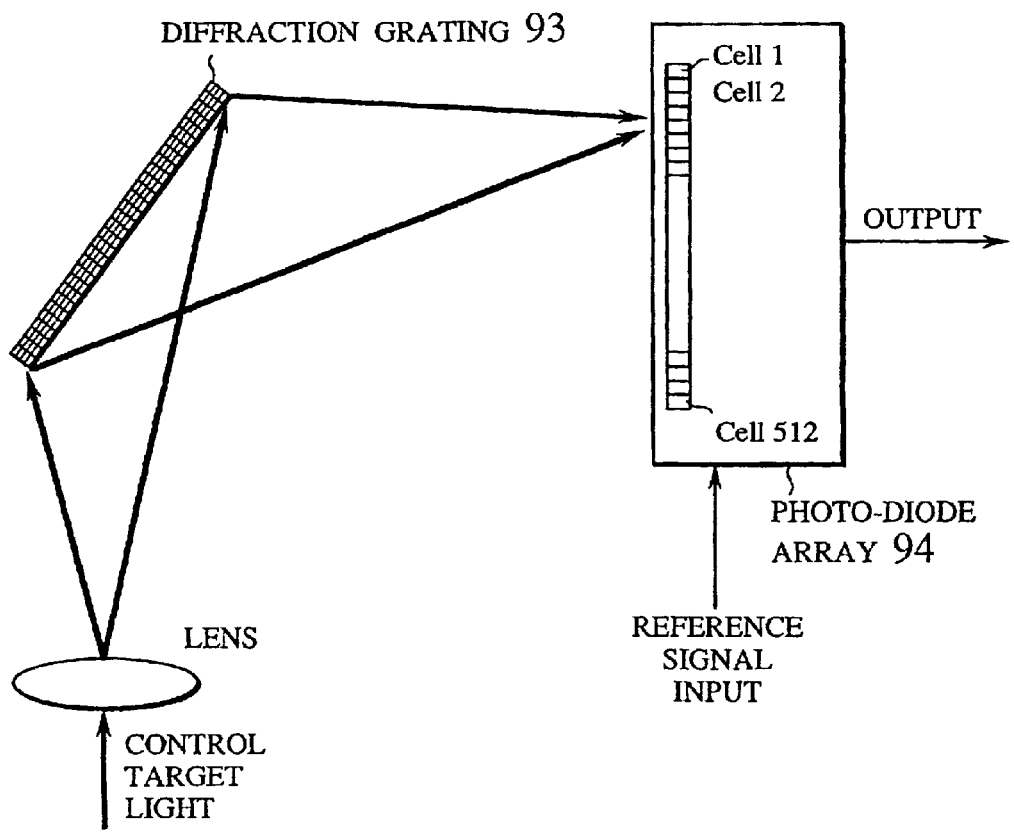
FIG. 25 is a schematic diagram showing a diffraction grating and a photo-diode array circuit used in the optical wavelength control apparatus of FIG. 24.

Referring now to FIG. 24 and FIG. 25, the eleventh embodiment of an optical wavelength control apparatus according to the present invention will be described in detail. This eleventh embodiment corresponds to the configuration of FIG. 7 described above, which is directed to a case of realizing the optical frequency pulling by using a reference signal generated by a reference signal generation circuit as a reference signal corresponding to the reference optical frequency.

In an optical wavelength control apparatus of FIG. 24, the variable wavelength light source 1 of FIG. 7 is provided by a laser light source 11, while the optical diffraction unit 12 of FIG. 7 is provided by a diffraction grating 93. The periodic signal generation unit 13 of FIG. 7 can be provided by a photo-detector array in general, and is provided by a photo-diode array circuit 94 in this eleventh embodiment. The phase detection unit 3 of FIG. 7 is provided by a reference signal generation circuit 95, a reference signal phase shift circuit 96 and a phase comparator 97.

For the laser light source 11, a single mode external cavity type semiconductor laser which oscillates at 1.55 µm band is used. Here, the oscillation wavelength is controlled by the temperature of the laser element, and the laser light source 11 is mounted on a Peltier element 91 driven by a temperature control circuit 92.

The diffraction grating 93 diffracts the control target light outputted from the laser light source 11 into a direction corresponding to its optical wavelength. The diffracted light is then entered into the photo-diode array circuit 94. Note that it is also possible to usean array optical waveguide instead of the diffraction grating 93.

The photo-diode array circuit 94 is formed by 512 pieces of photo-diode cells as shown in FIG. 25. This photo-diode array circuit 94 can be formed by the Model SUxxxLX Self-Scanned Linear photodiode arrays manufactured by the Sensors Unlimited Corporation of U.S.A., for instance. The signal reading timing for each photo-diode cell of the photo-diode array circuit 94 is controlled to have the signal reading period T such that the detection signals of the photo-diode cells No. 1 to No. 512 are sequentially outputted from the photo-diode array circuit 94 during one signal reading period T, one detection signal per every T/512 second, so that the output signals of the photo-diode array circuit 94 become periodic signals with phases varied according to the diffraction directions of the input diffracted lights. The signal reading period T is controlled by a reference signal (with a frequency f=1/T) generated by the reference signal generation circuit 95. The reference signal generated by the reference signal generation circuit 95 is also supplied to the phase comparator 97 through a reference signal phase shift circuit 96. By applying an appropriate phase shift to the reference signal at the reference signal phase shift circuit 96, a signal corresponding to the reference optical wavelength of the laser light source is obtained.

The phase comparator 97 compares a phase of this reference signal and a phase of the output signal of the photo-diode array circuit 94, and a resulting phase error signal is fed back to the temperature control circuit 92 such that the optical frequency of the laser light source 11 is pull-in controlled.

Figure 26:
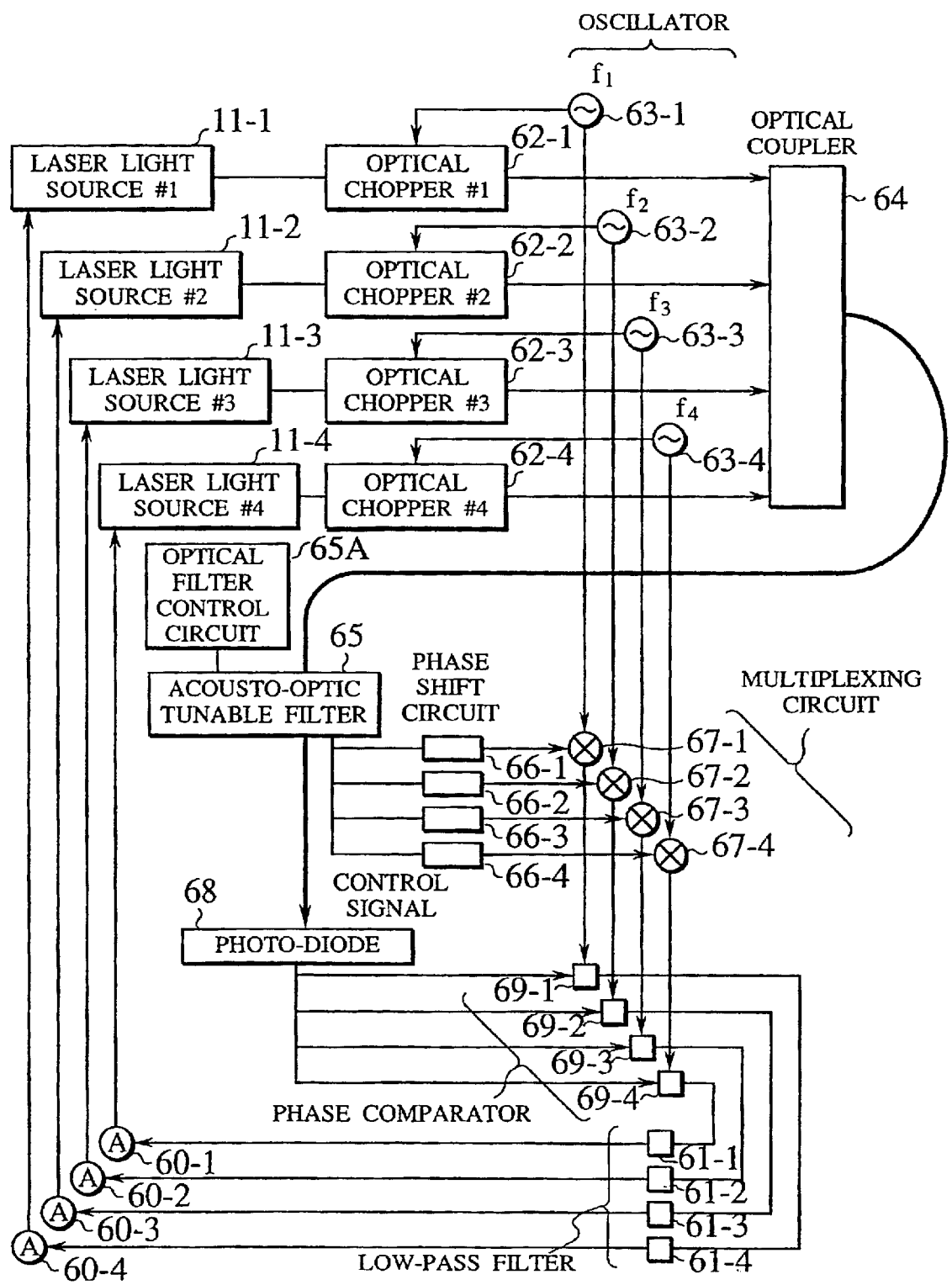
FIG. 26 is a block diagram showing the twelfth embodiment of the optical wavelength control apparatus according to the present invention.

Referring now to FIG. 26, the twelfth embodiment of an optical wavelength control apparatus according to the present invention will be described in detail. This twelfth embodiment corresponds to the configuration of FIG. 8 described above, which is directed to a configuration for realizing the simultaneous pull-in control of optical wavelengths of output lights of a plurality of laser light sources with respect to respectively set reference optical wavelengths.

In an optical wavelength control apparatus of FIG. 26, the variable wavelength light sources 1—1 to 1-N of FIG. 8 are provided by laser light source 11-1 to 11-4, while the optical modulation unit 5 of FIG. 8 is provided by optical choppers 62-1 to 62-4 and oscillators 63-1 to 63-4. Also, the wavelength scanning unit 2 of FIG. 8 is provided by an AOTF 65 controlled by an optical filter control circuit 65A, while the control signal conversion unit 7 of FIG. 8 is provided by phase shift circuits 66-1 to 66-4 and multiplexing circuits 67-1 to 67-4. Also, the photo-electric conversion unit 6 of FIG. 8 is provided by a photo-diode 68, while the phase detection unit 3 of FIG. 8 is provided by phase comparators 69-1 to 69-4.

For each of the laser light sources 11-1 to 11-4, a single mode external cavity type semiconductor laser which oscillates at 1.55 µm band is used. Their outputs are intensity modulated by the optical choppers 62-1 to 62-4 which are driven by frequencies f1 to f4, respectively. Here, the oscillators 63-1 to 63-4 function as the optical modulation signal source for driving the optical choppers 62-1 to 62-4. Note that it is also possible to use the direct modulation without using modulators here. The outputs from the optical choppers 62-1 to 62-4 are coupled by the optical coupler 64 and then entered into the AOTF 65 that constitutes the wavelength scanning unit.

The AOTF 65 is controlled by control signals from the optical filter control circuit 65A containing an RF signal source such as VCO which drives the AOTF 65. These control signals are given in forms of prescribed periodic signals and also supplied to the phase shift circuits 66-1 to 66-4. By applying appropriate phase shifts to these control signals at the phase shift circuits 66-1 to 66-4, signals corresponding to the reference optical wavelengths of the respective laser light sources are obtained.

The multiplexing circuits 67-1 to 67-4 respectively multiply outputs of the oscillators 63-1 to 63-4 by outputs of the phase shift circuits 66-1 to 66-4 to obtain the converted control signals, and respectively output the converted control signals to the phase comparators 69-1 to 69-4.

On the other hand, the optical pulses outputted from the AOTF 65 are converted into electric signals by the photo-diode 68, and then outputted to the phase comparators 69-1 to 69-4.

The phase comparators 69-1 to 69-4 obtain phase error signals from the outputs of the respective multiplexing circuits 67-1 to 67-4 and the outputs of the photo-diode 68, and feed them back to power sources 60-1 to 60-4 that drive the laser light sources 11-1 to 11-4, through low-pass filters 61-1 to 61-4 so as to realize the independent optical wavelength control for each light source.

Figure 27:
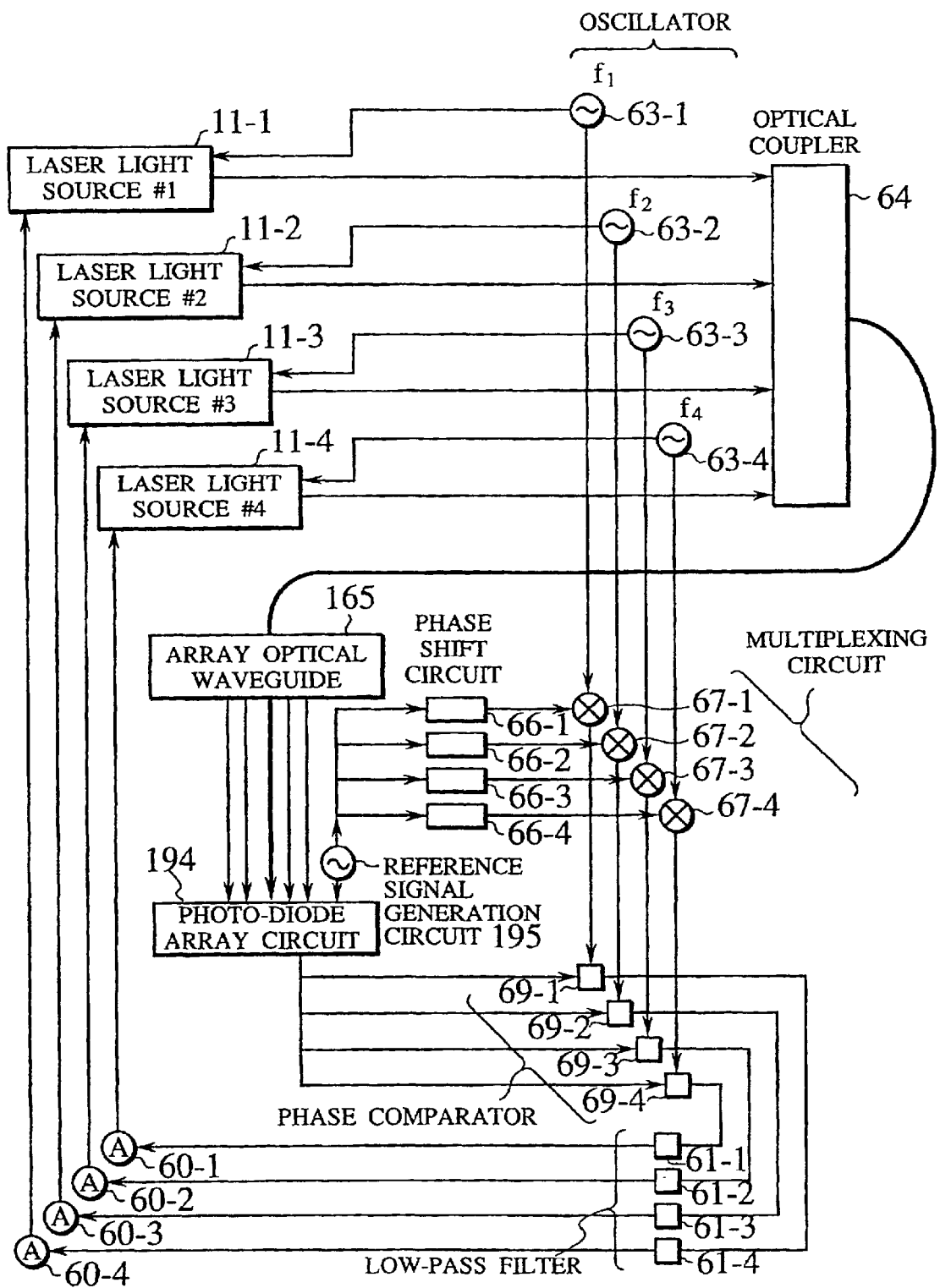
FIG. 27 is a block diagram showing the thirteenth embodiment of the optical wavelength control apparatus according to the present invention.

Referring now to FIG. 27, the thirteenth embodiment of an optical wavelength control apparatus according to the present invention will be described in detail. This thirteenth embodiment corresponds to the configuration of FIG. 8 described above, with a modification to replace the wavelength scanning unit 2 and the photo-electric conversion unit 6 of FIG. 8 by the optical diffraction unit 12 and the periodic signal generation unit 13 of FIG. 7, which is directed to a configuration for realizing the simultaneous pull-in control of optical wavelengths of output lights of a plurality of laser light sources with respect to respectively set reference optical wavelengths.

In an optical wavelength control apparatus of FIG. 27, the variable wavelength light sources 1—1 to 1-N of FIG. 8 are provided by laser light source 11-1 to 11-4, while the optical modulation unit 5 of FIG. 8 is provided by oscillators 63-1 to 63-4 and superposition circuits (not shown) for superposing outputs of the oscillators 63-1 to 63-4 onto the laser light sources 11-1 to 11-4. In general, the superposition circuits are provided by the Bias-T circuits which are built-in inside the laser light sources 11-1 to 11-4. Thus the output light intensities of the laser light sources 11-1 to 11-4 are modulated by the direct modulation without using modulators. Note that it is also possible to use the intensity modulation using modulators here.

Also, the optical diffraction unit 12 of FIG. 7 is provided by an array optical waveguide 165. The periodic signal generation unit 13 of FIG. 7 can be provided by a photo-detector array in general, and is provided by a photo-diode array circuit 194 and a reference signal generation circuit 195 in this thirteenth embodiment. The control signal conversion unit 7 of FIG. 8 is provided by phase shift circuits 66-1 to 66-4 and multiplexing circuits 67-1 to 67-4, while the phase detection unit 3 of FIG. 8 is provided by phase comparators 69-1 to 69-4.

For each of the laser light sources 11-1 to 11-4, a single mode DFB semiconductor laser which oscillates at 1.5 $\mu$m band is used. Their outputs are directly modulated by small signals at frequencies f1 to f4, respectively. Here, the oscillators 63-1 to 63-4 function as the optical direct modulation signal source, and their outputs are entered into the laser light sources 11-1 to 11-4, respectively. The outputs from the laser light sources 11-1 to 11-4 are coupled by the optical coupler 64 and then entered into the array optical waveguide 165 for diffracting control target lights into mutually different directions corresponding to optical wavelengths of the control target lights.

The array optical waveguide 165 has 256 waveguides on its output side, and diffracted lights are outputted according to respective waveguides according to the optical wavelengths of the input lights. Note that it is also possible to use the diffraction grating instead of the array optical waveguide 165.

The photo-detector array circuit 194 is coupled to the output of the array optical waveguide 165, with one photo-diode cell coupled to the output of one waveguide. The photo-diode array circuit 194 is formed by 256 pieces of photo-diode cells. The signal reading timing for each photo-diode cell of the photo-diode array circuit 194 is controlled to have the signal reading period T such that the detection signals of the photo-diode cells No. 1 to No. 256 are sequentially outputted from the photo-diode array circuit 194 during one signal reading period T, one detection signal per every T/256 second, so that the output signals of the photo-diode array circuit 194 become periodic signals with phases varied according to the output waveguides of the input diffracted lights. Note that these periodic signals are periodic in period T, but pulse intervals of N output pulses that are outputted during the time T are not periodic. The signal reading period T is controlled by a reference signal generated by the reference signal generation circuit 195. The reference signal generated by the reference signal generation circuit 195 is also supplied to the phase shift circuits 66-1 to 66-4. By applying appropriate phase shifts to these control signals at the phase shift circuits 66-1 to 66-4, signals corresponding to the reference optical wavelengths of the respective laser light sources are obtained.

The multiplexing circuits 67-1 to 67-4 respectively multiply outputs of the oscillators 63-1 to 63-4 by outputs of the phase shift circuits 66-1 to 66-4 to obtain the converted control signals, and respectively output the converted control signals to the phase comparators 69-1 to 69-4.

The phase comparators 69-1 to 69-4 obtain phase error signals from the outputs of the respective multiplexing circuits 67-1 to 67-4 and the outputs of the photo-diode array circuit 194, and feed them back to power sources 60-1 to 60-4 that drive the laser light sources 11-1 to 11-4, through low-pass filters 61-1 to 61-4 so as to realize the independent optical wavelength control for each light source.

As described, according to the present invention, it is possible to realize the optical frequency control and the optical frequency pulling operation for a light source over a wide bandwidth of 100 GHz to several THz using a control circuit having a narrow bandwidth of a few KHz, which has been difficult conventionally. As a consequence, it becomes possible to realize a wide bandwidth control required for the optical frequency control of a light source used in the ultra high speed time division multiplexed optical transmission system or a high density wavelength division multiplexed optical transmission system. It also becomes possible to realize a stable wide bandwidth optical frequency pulling operation required for a local light source of the coherent optical transmission system or a pumping light source of the phase sensitive optical amplifier.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for controlling an optical wavelength of a control target light outputted from a variable wavelength light source, comprising:

an optical diffraction means for diffracting the control target light entered from the variable wavelength light source into a direction corresponding to the optical wavelength of the control target light;

a periodic signal generation means for detecting a diffraction light diffracted by the optical diffraction means and generating periodic signals with a phase varied according to a diffraction direction of the diffraction light; and a phase detection means for detecting a phase difference between a phase of the periodic signals and a phase corresponding to a reference optical wavelength, and controlling the variable wavelength light source by feeding back the phase difference to the variable wavelength light source such that the optical wavelength of the control target light is controlled by an optical frequency pulling with respect to the reference optical wavelength according to the phase difference.

2. The apparatus of claim 1, wherein the periodic signal generation means generates the periodic signals by using a photo-detector array in which the phase of the periodic signals is varied depending on a photo-detector cell of the photo-detector array which detected the diffraction light.

3. A method for controlling an optical wavelength of a control target light outputted from a variable wavelength light source, comprising the steps of:

diffracting at an optical diffraction device the control target light entered from the variable wavelength light source into a direction corresponding to the optical wavelength of the control target light;

detecting a diffraction light diffracted by the optical diffraction device and generating periodic signals with a phase varied according to a diffraction direction of the diffraction light;

detecting a phase difference between a phase of the periodic signals and a phase corresponding to a reference optical wavelength; and controlling the variable wavelength light source by feeding back the phase difference to the variable wavelength light source such that the optical wavelength of the control target light is controlled by an optical frequency pulling with respect to the reference optical wavelength according to the phase difference.

* * * * *